US012399678B1

(12) United States Patent
Ramos et al.

(10) Patent No.: US 12,399,678 B1
(45) Date of Patent: Aug. 26, 2025

(54) STEM SEPARATION SYSTEMS AND DEVICES

(71) Applicant: MOISES SYSTEMS, INC., Salt Lake City, UT (US)

(72) Inventors: Geraldo Ramos, Salt Lake City, UT (US); Igor Gadelha Pereira, João Pessoa (BR); Caio Marcelo Campoy Guedes, Cabedelo (BR); Hugo Rodrigues, Salt Lake City, UT (US)

(73) Assignee: MOISES SYSTEMS, INC., Salt Lake City, UT (US)

( * ) Notice: Subject to any disclaimer, the term of this patent is extended or adjusted under 35 U.S.C. 154(b) by 0 days.

(21) Appl. No.: 19/061,111

(22) Filed: Feb. 24, 2025

Related U.S. Application Data

(60) Provisional application No. 63/708,164, filed on Oct. 16, 2024, provisional application No. 63/558,985, filed on Feb. 28, 2024.

(51) Int. Cl.
*G06F 3/16* (2006.01)
*G06F 3/04847* (2022.01)

(52) U.S. Cl.
CPC .......... *G06F 3/165* (2013.01); *G06F 3/04847* (2013.01)

(58) Field of Classification Search
CPC ....... G06F 3/162; G06F 3/165; G06F 3/04847
See application file for complete search history.

(56) References Cited

U.S. PATENT DOCUMENTS

| 11,848,655 | B1 | 12/2023 | Khalilia et al. |
| 2006/0210097 | A1* | 9/2006 | Yerrace .................. G06F 3/165 |
| 2010/0299151 | A1 | 11/2010 | Soroka et al. |
| 2013/0135526 | A1 | 5/2013 | Minemura |
| 2016/0050420 | A1 | 2/2016 | Helmrich et al. |
| 2016/0127441 | A1* | 5/2016 | Monastyrskyy ...... H04L 65/611 709/219 |
| 2017/0126343 | A1 | 5/2017 | Holman |

(Continued)

FOREIGN PATENT DOCUMENTS

WO    2023/235676 A1    12/2023

OTHER PUBLICATIONS

International Search Report and Written Opinion received for PCT Patent Application No. PCT/US2025/017834, mailed on May 12, 2025, 25 pages.

*Primary Examiner* — Joseph Saunders, Jr.
(74) *Attorney, Agent, or Firm* — WORKMAN NYDEGGER

(57) ABSTRACT

A method comprises: (i) presenting a user interface frontend that displays a control for activating a system-level stem separation mode; and (ii) after receiving user input activating the system-level stem separation mode, and when a system generates a system output audio signal based on audio associated with one or more applications executing on the system: (a) refraining from sending the system output audio signal to one or more playback devices over a system audio output signal path; (b) identifying a set of one or more segments of the system output audio signal; (c) processing the set of one or more segments using a selected stem separation module to generate a set of stem-separated segments comprising a plurality of audio stems; and (d) sending at least one audio stem from the plurality of audio stems to the one or more playback devices via the system audio output signal path.

20 Claims, 15 Drawing Sheets

(56) References Cited

U.S. PATENT DOCUMENTS

| | | |
|---|---|---|
| 2017/0301330 A1 | 10/2017 | Fejzo et al. |
| 2018/0122403 A1* | 5/2018 | Koretzky .............. G10L 21/028 |
| 2019/0339931 A1 | 11/2019 | Fraga et al. |
| 2022/0269473 A1* | 8/2022 | Robert Jose ............ G06F 3/167 |
| 2023/0368759 A1 | 11/2023 | Johnson et al. |

* cited by examiner

STEM SEPARATION SYSTEMS AND DEVICES

CROSS-REFERENCE TO RELATED APPLICATIONS

This application claims priority to U.S. Provisional Patent Application No. 63/708,164, filed on Oct. 16, 2024, and entitled "STEM SEPARATION SYSTEMS AND DEVICES", and to U.S. Provisional Patent Application No. 63/558,985, filed on Feb. 28, 2024, and entitled "STEM SEPARATION SYSTEMS AND DEVICES", the entirety of which are incorporated herein by reference for all purposes.

BACKGROUND

Audio processing involves manipulating, refining, transforming, and/or extracting information from audio signals. In the music industry, audio processing plays an important role in shaping and enhancing the quality of music. Audio processing is also performed in various other domains, such as film and television, broadcasting and radio, telecommunications, speech recognition and synthesis, gaming, and/or others.

The subject matter claimed herein is not limited to embodiments that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
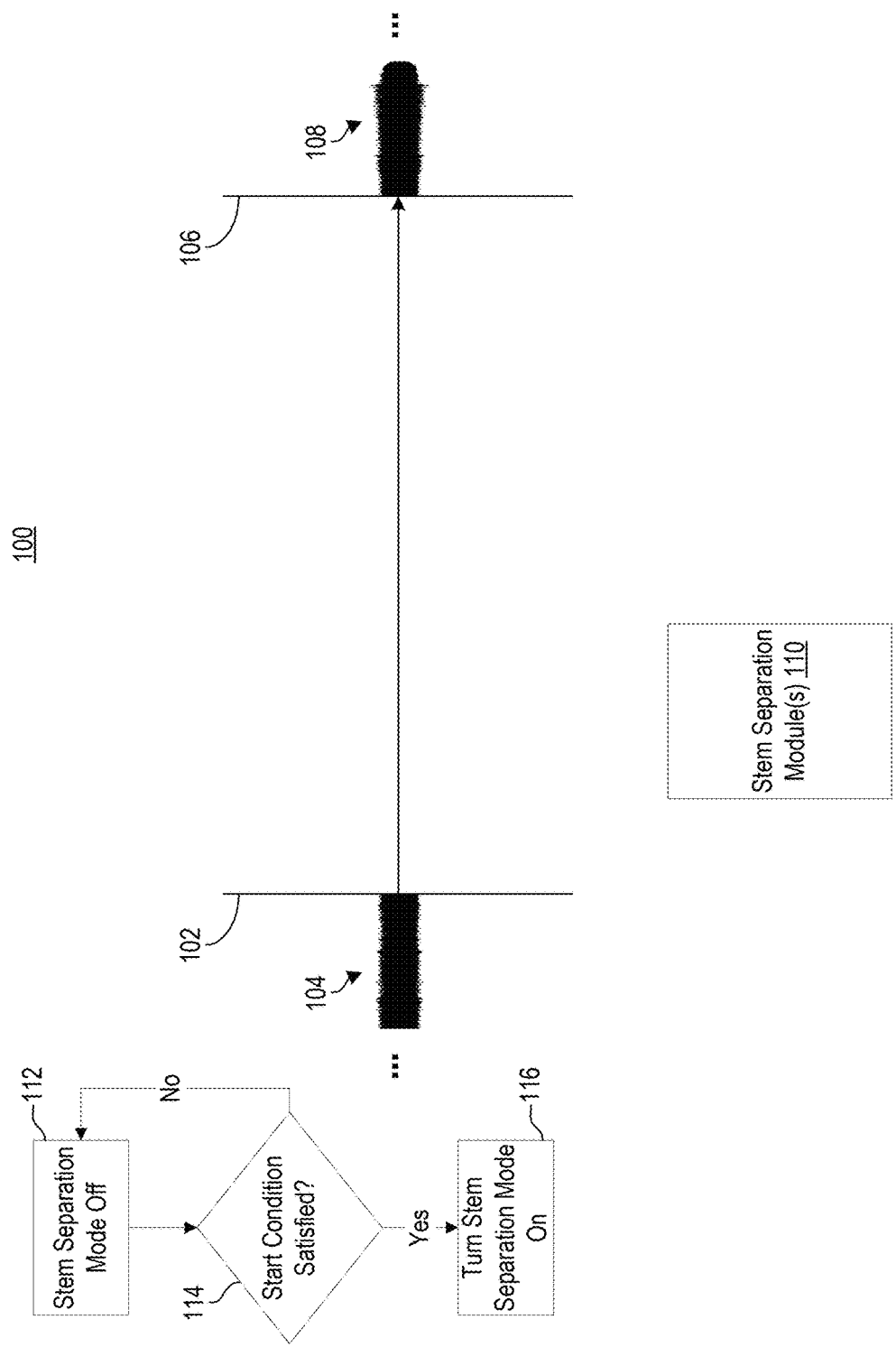
FIGS. 1A, 1B, 1C, and 1D show conceptual representations of example components, elements, and acts associated with device-driven stem separation in playback environments.

Disclosed embodiments are directed to systems and devices for facilitating stem separation.

As noted above, audio processing is performed in various domains and involves manipulating, refining, transforming, and/or extracting information from audio signals. Audio stem separation (or simply "stem separation") is one type of audio processing that involves separating audio into its basic components or "stems," which correspond to types of sound represented in the audio such as vocals, drums, bass, strings, piano/keys, melody, dialogue, effects, background music, uncategorized sound, etc. Stem separation is performed in various domains, such as music production, music education, creating karaoke tracks, forensic audio analysis, etc.

Conventional stem separation algorithms can analyze and separate individual audio stems from a single audio file, relying on pattern recognition and spectral analysis to separate sounds sources from the audio file based on unique characteristics such as frequency and amplitude. Many conventional stem separation algorithms utilize artificial intelligence (AI) techniques (e.g., utilizing deep learning and neural networks) to improve isolation of different sound sources from an audio track where different sound sources have overlapping frequencies (which can occur in the audio track simultaneously).

Conventional stem separation models are often provided as cloud services, where users are able to submit jobs defining one or more audio tracks to be processed using stem separation models that consume cloud resources. The stem-separated audio output (including individual audio stems for the input audio track(s)) is then provided to the requester (e.g., as a downloadable file).

Conventional stem separation models typically consume significant power and computational resources and are therefore implemented in high-resource environments (e.g., using graphics processing units (GPUs) residing on cloud servers).

At least some disclosed embodiments are directed to devices that are configurable to perform audio stem separation on an input audio signal while outputting a stem-separated audio signal for playback by one or more playback components. Implementation of embodiments disclosed herein can enable isolation and playback of audio stems from input audio signals (not limited to complete audio files) in resource-constrained environments, such as on user electronic devices. A device for facilitating stem separation in playback environments, as described herein, can include one or more processing units and one or more computer-readable recording media (e.g., computer memory). The processing unit(s) can include one or more central processing units, neural processing units, graphics processing units, and/or other types of processing circuities.

The device can receive an input audio signal (e.g., a digital audio signal from any source, such as a file, stream, radio, line-in, analog conversion, or other source) and identify a first set of segments from the input audio signal. The first set of segments can include one or more audio segments of the input audio signal that have one or more specified durations (e.g., with the segment(s) having an individual or aggregate duration within a range of about half second to about four seconds, in some instances, or a duration greater than four seconds or less than a half second). For instance, the device may receive the input audio signal over time (e.g., in the case of a line-in connection or radio, streaming, television broadcast, or other media playback signal transmission modalities) and may define the first set of segments as the device receives the input audio signal (e.g., defining each temporal second (or other duration) of the received audio signal as a separate set of one or more audio segments).

After a first set of audio segments is defined, the device may process the first set of audio segments using a stem separation module, which may provide a first set of stem-separated segments (the set including one or more stem-separated segments). The first set of stem-separated segments can include multiple audio stems that correspond to different audio sources represented in the first set of audio segments (e.g., vocals, bass, drums, guitars, strings, piano/keys, wind, noise, sound effects, other/remaining audio).

The stem separation module can be locally stored on the device and can comprise a condensed, compact, lightweight, embedded, or mobile stem separation module adapted for implementation in hardware/resource-constrained environments, as will be described in more detail hereinbelow. In some implementations, the stem separation module is selected from a set or library of stem separation modules stored on the device. The stem separation module can be selected based on one or more configurations, preferences, settings, or contexts for the current stem separation session. For instance, in conjunction with activating a stem separation mode for the device, a user can indicate via user input one or more of: (i) which audio stems are present in the input audio signal (e.g., vocals, bass, drums, guitars, strings, piano/keys, wind, and/or other stems) or (ii) which audio stem(s) from the input audio signal to isolate for playback. The device may utilize such indications to select a stem separation module to use for the particular stem separation session. For example, the device may store multiple stem separation modules that are adapted for use with certain media types (e.g., music or different genres of music, audiovisual content such as film or video game content with accompanying audio), for use with audio signals containing certain audio stems, or for outputting certain audio stems (or combinations of audio stems) for playback. The device may utilize the user indications provided via user input noted above (e.g., via lookup table or other search/selection methods) to select a stem separation module to use in a current (or future) stem separation session.

Additionally, or alternatively, the device can perform pre-processing on an initial segment of the input audio signal to determine the identifying information for the audio signal or to determine which audio stems are present in the audio signal. Such information, obtained by pre-processing an initial segment of the input audio signal, can be used to enable the device to automatically select a stem separation module (e.g., via lookup table or other search/selection methods) to use for a current (or future) stem separation session.

After processing the first set of audio segments of the input audio signal via the (selected) stem separation module to obtain the first set of stem-separated segments, the device may cause playback of at least one selected audio stem from the first set of stem-separated segments. For instance, user input, preferences, or settings may designate a desired audio stem(s) for playback (e.g., vocals, bass, drums, guitars, strings, piano/keys, wind, other/remaining audio), and the device may cause playback of a selected audio stem from the first set of stem-separated segments that corresponds to the desired audio stem(s). The device may cause playback of the selected audio stem(s) by converting the selected audio stem(s) to an analog signal and providing the analog signal to a speaker (e.g., to an on-device speaker or to a separate or off-device speaker via a line-out connection). Additionally, or alternatively, the device may send a digital representation of the selected audio stem(s) from the first set of stem-separated segments to a playback device (e.g., via a digital interface or wireless connection) to facilitate playback of the selected audio stem(s) by the playback device (where analog conversion may occur at the playback device). Playing back the selected audio stem(s) can comprise selectively refraining from playing back unselected audio stem(s) (e.g., the device may cause playback of the vocal stem(s) only while refraining from playing back other audio stems).

During playback of the selected audio stem(s) of the first set of stem-separated segments (or during processing of the first set of segments from the input audio signal by the stem separation module to obtain the first set of stem-separated segments), the device may identify a second set of segments (one or more second segments) from the input audio signal, such as by continuing to receive the input audio signal over time and defining the second set of segments as the device receives the input audio signal (e.g., defining a temporal second (or other duration) subsequent to the first temporal second (or other duration) of the received audio signal as the second set of segments).

When the second set of audio segments is defined, the device may process the second set of audio segments to obtain a second set of stem-separated segments (one or more second stem-separated segments), which can include multiple audio stems that correspond to different audio sources represented in the second set of audio segments. The second set of audio segments can be processed by the stem separation module in series with the processing of the first set of audio segments (e.g., after processing of the first set of audio segments by the stem separation module is complete, or during playback of the first set of audio segments) or at least partially in parallel with the processing of the first set of audio segments (e.g., where processing of the second set of audio segments is initiated prior to completion of processing of the first set of audio segments via the stem separation module, which may depend on the hardware capabilities of the device).

After playback of the selected audio stem(s) of the first set of stem-separated segments is complete, the device may cause playback of selected audio stem(s) of the second set of stem-separated segments (which may correspond to the same audio sources as the selected audio stem(s) of the first set of stem-separated segments). Playback of the selected audio stem(s) of the second set of stem-separated segments may be achieved in a manner similar to that described above for playback of the selected audio stem(s) of the first set of stem-separated segments.

In some instances, prior to initiation of a stem separation mode, the device can playback the input audio signal without performing stem separation thereon (e.g., by passing the input audio signal to one or more on-device or off-device playback components, which can include intermediate processing/transformations such as analog-to-digital or digital-to-analog conversion, encoding/decoding, compression/decompression, wireless or wired data transmission, etc.). During playback of the input audio signal, the device can receive user input directed to activating the stem separation mode. The user input can take on any suitable form (e.g., via user interaction with user interface hardware, such as a touchscreen, mouse, keyboard, or other controller, button/switch/knob, microphone for voice input, image sensor for gesture input, etc.). After detecting the user input for activating the stem separation mode, the device can refrain from continuing playback of the input audio signal and can activate the stem separation mode to begin stem separation processing to facilitate playback of one or more individual audio stems of the input audio signal. In some instances, the stem separation module to be used for stem separation processing is determined based on user input and/or based on pre-processing of the input audio signal (e.g., before or after activation of the stem separation mode).

When the device operates in the stem separation mode, the acts of (i) identifying an audio segment (or set of audio segments) from an input audio signal, (ii) processing the audio segment (or set of audio segments) using the stem separation module to obtain a stem-separated segment (or set of stem-separated audio segments), and (iii) causing playback of one or more audio stems of the stem-separated segment can be performed iteratively until a stop condition is satisfied. Within each iteration, acts (i) and/or (ii) noted above can be performed for a current audio segment during processing of a previously identified audio segment or during playback of an audio stem of a previously-generated stem-separated segment. Within each iteration, act (iii) noted above can be performed after playback of an audio stem of a previously-generated stem-separated segment is complete (or during completion thereof). Act (iii) noted above can include refraining from playing back one or more remaining audio stems (e.g., to isolate or remove vocals and/or one or more types of user instruments, etc.). In some implementations, one or more audio stitching operations are performed to combine consecutively generated audio stems for playback. In some instances, the input audio signal on which stem separation is performed to facilitate playback of one or more individual audio stems is associated or synchronized to an input video signal. Playback of the video signal can be delayed to be temporally synchronized with the playback of the individual audio stem(s) facilitated via operation of the stem separation mode.

After the stop condition is satisfied, the system can deactivate the stem separation mode and can, in some instances, revert to causing playback of the input audio signal without applying stem separation thereto.

The stop condition for triggering deactivation of the stem separation mode can take on various forms. For instance, the stop condition can comprise detecting user input directed to deactivating the stem separation mode (any type of user input may be utilized). In some implementations, the stop condition can comprise performance of a predetermined number of stem separation iterations, or can comprise satisfaction of other metrics, values, or thresholds (e.g., number of times or amount of time that a stem separation module is run, number of audio segments identified or processed from the input audio signal, number or duration of separated audio stems played back or enqueued for playback, number or duration of audio tracks or media content items on which stem separation is performed, temporal amount of input audio signal processed, temporal amount of stem-separated audio signal played back, amount of time spent in the stem separation mode, and/or others).

The stop condition for deactivating the stem separation mode, or the metric/value thresholds associated therewith, can be defined based at least in part on a service level associated with the stem separation software/models stored on the device. For instance, the device may comprise a consumer electronic device (e.g., a speaker, a musical instrument, a television, a home theater system, a vehicle sound system, an amplifier or smart amplifier, a mobile electronic device, etc.), and a limited, trial, or constrained version of the stem separation software/models can be initially ported to the electronic device (e.g., at the manufacturer/developer level). For example, a manufacturer or developer can access a limited version of the stem separation software/models via a third-party software library for implementation with an electronic device produced by the manufacturer or developer (e.g., after verifying that the electronic device provides sufficient hardware support for operation of the stem separation software/models). The limited version of the stem separation software/models can constrain operation of the stem separation models by imposing one or more of the stop conditions for operation of the stem separation mode (e.g., causing deactivation of the stem separation mode after one or more thresholds are satisfied, as noted above). A full version of the stem separation software/models can be subsequently ported to the electronic device (e.g., after a trial period, after licensing, after subscription or compensation to the third party by the end user and/or manufacturer, etc.). The full version of the stem separation software/models can omit the constraints associated with the limited version. For instance, the metric, value, or threshold-based stop conditions associated with the limited version can be omitted from the full version (with the primary stop condition being user-directed deactivation of the stem separation mode). In some instances, the full version of the stem separation software/models is initially ported to the electronic device at the manufacturer/developer level, but remains in a constrained, locked, or limited state until further action by the end user or manufacturer.

Having just described some of the various high-level features and benefits of the disclosed embodiments, attention will now be directed to the Figures, which illustrate various conceptual representations, architectures, methods, and/or supporting illustrations related to the disclosed embodiments.

FIGS. 1A, 1B, 1C, and 1D show conceptual representations of example components, elements, and acts associated with device-driven stem separation in playback environments. In particular, FIG. 1A illustrates example aspects of a device 100 for facilitating stem separation in a playback environment. The device 100 can comprise a consumer electronic device, such as, by way of non-limiting example, a speaker, a television, a home theater system, a vehicle sound system, an amplifier or smart amplifier, a mobile electronic device, and/or others. The device 100 can comprise, correspond to, or include one or more components of a system 1200, as described hereinafter with reference to FIG. 12. The device 100 of FIG. 1A includes an input interface 102 that enables the device 100 to receive or otherwise access an input audio signal 104 (represented in FIG. 1A as a waveform). In the example of FIG. 1A, the input audio signal 104 can comprise an audio signal of a music track that is continuously provided to or accessed/utilized by the device 100 over time, such as via analog or digital broadcast or streaming (e.g., analog radio, digital radio, satellite radio, internet or network streaming), analog or digital interface, and/or other modalities. In some instances, the input audio signal 104 comprises an analog signal from an analog audio transmission (e.g., an analog audio broadcast or line-in connection), which is converted to a digital signal by the device 100. The input interface 102 for facilitating access to or acquisition of the input audio signal 104 take on any suitable form, such as wireless communication hardware (e.g., Bluetooth, Wi-Fi, or other wireless communication protocol), wired communication hardware (e.g., a line-in connection such as 3.5 mm jack (AUX), RCA cables, XLR cables, TRS/TRRS cables, USB audio, HDMI, optical, coaxial), an audio channel or bus, and/or others.

FIG. 1A illustrates the device 100 as including an output interface 106, whereby the device 100 can cause playback of an output audio signal 108. For example, the device 100 may receive the input audio signal 104 via the input interface 102 and pass the input audio signal 104 to the output interface 106 (as indicated by the arrow extending from the input interface 102 to the output interface 106) to facilitate audio playback (producing the output audio signal 108). In some instances, the device 100 can perform one or more intermediate operations on the input audio signal 104 received at the input interface 102 to produce the output audio signal 108 (e.g., analog-to-digital or digital-to-analog conversion, encoding/decoding, compression/decompression, wireless or wired data transmission, etc.). The output interface 106 can comprise a speaker of the device 100 or a communication channel (analog or digital, and wired or wireless) between the device 100 and a separate playback device.

FIG. 1A furthermore illustrates that the device 100 can comprise stem separation module(s) 110, which may be locally stored on the device 100. The stem separation module(s) 110 can comprise one or more condensed, compact, lightweight, embedded, or mobile stem separation module adapted for implementation in hardware/resource-constrained environments. For instance, the stem separation module(s) 110 can be configured to analyze short (potentially overlapping) frames or segments of audio from the input audio signal 104 (thereby reducing the amount of data being processed at any given instant into manageable chunks). The analyzed frames or segments can be temporally adjacent, enabling formation of temporally continuous output of individual audio stems.

The segments analyzed by the stem separation module(s) 110 can be about 1 second long or within a range of about 0.5 seconds to about 4 seconds or greater (e.g., less than 8 seconds). For each frame or segment of audio identified from the input audio signal 104, the stem separation module(s) 110 can extract features relevant to the audio stems to be separated, such as temporal features/relationships, spectral features, phase information, magnitude information, learned features (e.g., determined via feature learning models), spatial audio information, and/or other sound characteristics. In some instances, the stem separation module(s) 110 can utilize a reduced feature size relative to conventional stem separation modules, such as 256-channel features, 128-channel features, 64-channel features, etc. The stem separation module(s) 110 can utilize the extracted features to predict the components for each audio stem represented in each frame/segment. The stem separation module(s) 110 can apply masking or filtering to the frame/segment (or the spectral representation thereof) to isolate each audio stem of the frame/segment. Continuous audio for each of the represented audio stems may be formed by stitching or reconstructing temporally adjacent stem-separated audio segments together (e.g., accounting for potential temporal overlap between the segments).

In some implementations, the stem separation module(s) 110 are adapted for use with certain processing units or hardware accelerators, such as neural processing units (NPUs) and central processing units (CPUs), which can have lower power and/or resource consumption levels than graphics processing units (GPUs). For example, to facilitate processing via one or more NPUs, the stem separation module(s) 110 can be configured to refrain from utilizing complex numbers, such as by refraining from conventional techniques for generating spectrograms of audio frames/segments identified from the input audio signal 104 (e.g., instead relying on time-domain information/techniques, such as direct model-based prediction in the time domain, using customized time-domain features, mapping time-domain information to a latent space for separating stems, time-domain filtering techniques, etc.). As another example, the stem separation module(s) 110 can be subjected to quantization, where model parameters are represented using lower-bit width numbers (e.g., 8-bit or 16-bit integers rather than floating point numbers), which can reduce model size and/or increase model speed. The model size of the stem separation module(s) 110 can be further reduced by reducing the quantity of model layers (e.g., four transformer layers), which can adapt the stem separation module(s) 110 for operation on memory-constrained devices (in contrast with cloud servers, where conventional stem separation models are typically used). In some implementations, the stem separation module(s) 110 is/are generated using techniques such as knowledge distillation, weight pruning, neuron pruning, quantization, parameter sharing, factorization, and/or others.

In the example of FIG. 1A, the device 100 operates with a stem separation mode in an "off" state (indicated by block 112), wherein the device 100 receives the input audio signal 104 via the input interface 102 and provides the output audio signal 108 at the output interface 106 (e.g., without utilizing the stem separation module(s) 110). While operating with the stem separation mode off, the device 100 can determine whether a start condition has been satisfied (indicated by block 114). A start condition can comprise one or more conditions for activating the stem separation mode, such as receiving a user command or detecting the presence of one or more events/states (e.g., characteristics of the input audio signal 104). When a start condition is not satisfied (indicated by the "No" arrow extending from block 114), the device 100 may continue to operate with the stem separation mode in the "off" state (indicated by block 112), which may comprise continuing audio playback without performance of stem separation. When a start condition is satisfied (indicated by the "Yes" arrow extending from block 114), the device 100 may begin operating with the stem separation mode in an "on" state (indicated by block 116).

Figure 1B:
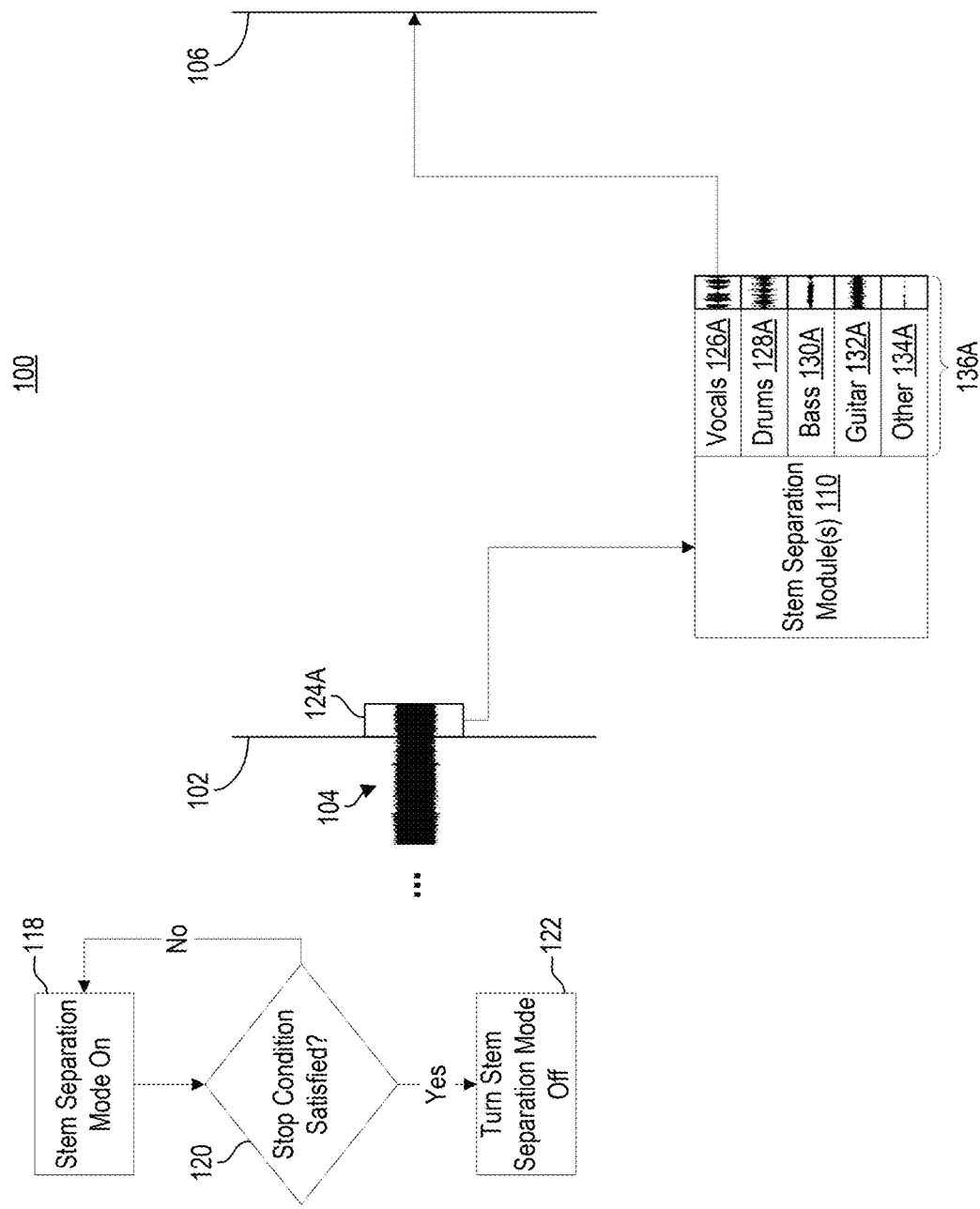

FIG. 1B illustrates an example in which the device 100 operates with the stem separation mode in an "on" state (indicated by block 118). While operating with the stem separation mode on, the device 100 can determine whether a stop condition has been satisfied (indicated by block 120). A stop condition can comprise one or more conditions for deactivating the stem separation mode, such as receiving a user command, detecting that an allotted or permitted amount of stem separation (or operation with the stem separation mode on) has been performed, and/or other conditions as described hereinabove. When a stop condition is not satisfied (indicated by the "No" arrow extending from block 120), the device 100 may continue to operate with the stem separation mode in the "on" state (indicated by block 118). When a stop condition is satisfied (indicated by the "Yes" arrow extending from block 120), the device 100 may begin operating with the stem separation mode in the "off" state (indicated by block 122).

Pursuant to operation of the device 100 with the stem separation mode in the "on" state, the device 100 may identify a segment 124A from the input audio signal 104. For instance, as the device 100 receives the input audio signal 104 via the input interface 102 over time, the device 100 may define a temporal segment (e.g., a one-second segment, or another duration) of the received input audio signal 104 as the segment 124A. For illustrative purposes, FIG. 1B conceptually depicts the segment 124A as a portion of the input audio signal 104 that has passed through the input interface 102 (traveling from left to right). Although FIG. 1B illustrates the segment 124A as including a single temporal segment, the segment 124A may include a plurality of constituent segments that, together, form the segment 124A (e.g., constituent segments can temporally overlap).

With the stem separation mode on, the device 100 may process the segment 124A using the stem separation module(s) 110. As noted above, the stem separation module(s) 110 can include multiple stem separation modules, and the device 100 may select a particular stem separation module to use in the current stem separation session (e.g., to process segment 124A and/or subsequent segments). The stem separation module(s) 110 can include different stem separation modules tailored for different use cases (e.g., different genres of music, different stems to be separated/output, different audio sources present in the input audio signal 104, etc.). For instance, the stem separation module(s) 110 can include: one or more stem separation modules configured to identify/separate one or more or a combination of vocals stems, bass stems, drums stems, guitars stems, strings stems, piano stems, keys stems, wind stems, and/or other/remaining audio stems (e.g., musical stem separation module(s)); one or more stem separation modules configured to identify/separate one or more or a combination of dialogue stems, music stems, and/or effects stems (e.g., cinematic stem separation module(s)); one or more stem separation modules configured to identify/separate one or more or a combination of lead vocals stems, backing vocals stems, and/or other vocals stems (e.g., vocals stem separation module(s)); one or more stem separation modules configured to identify/separate one or more or a combination of rhythm guitars stems, solo guitars stems, and/or other guitars stems (e.g., guitar parts stem separation module(s)); one or more stem separation modules configured to identify/separate one or more or a combination of kick drum stems, snare drum stems, toms stems, hi-hat stems, cymbals stems, and/or other drum stems (e.g., drum stem separation module(s)); and/or one or more stem separation modules configured to identify/separate one or more or a combination of acoustic guitar stems, electric guitar stems, and/or other guitar stems (e.g., guitar stem separation module(s)).

The device 100 may select a particular stem separation module from the stem separation module(s) 110 for the current stem separation session based on user input, such as user input selecting a stem separation module from a listing of the available stem separation module(s) 110 or user input indicating identifying information for the audio signal on which stem separation will be performed, which audio stems are present in the input audio signal, which audio stem(s) from the input audio signal to isolate for playback, and/or other information. In some implementations, the device 100 may select a particular stem separation module from the stem separation module(s) 110 for the current stem separation session based on pre-processing of an initial segment of the input audio signal 104. Such pre-processing can utilize, for instance, a classification module (e.g., SVMs, neural networks, random forests, and/or others) trained to classify segments of input audio (and/or features extracted therefrom) to provide one or more labels indicating the audio sources present in the input audio. The labels may be used to select the particular stem separation module for the current stem separation session.

FIG. 1B conceptually depicts the stem separation module(s) 110 receiving and processing the segment 124A to generate a stem-separated segment 136A (which can comprise multiple constituent stem-separated segments, such as where the segment 124A includes multiple constituent segments). The stem-separated segment 136A can include the audio stems associated with different audio sources represented in the segment 124A processed by the stem separation module(s) 110. For instance, FIG. 1B illustrates the stem-separated segment 136A as including a vocals stem 126A, a drums stem 128A, a bass stem 130A, a guitar stem 132A, and an other stem 134A (representing remaining audio that is not part of the other stems). Each audio stem of the stem-separated segment 136A of FIG. 1B is illustrated adjacent to a waveform representing the separated audio content. One will appreciate, in view of the present disclosure, that the stems of the stem-separated segment 136A of FIG. 1B are provided by way of example only and are not limiting of the disclosed principles (e.g., a stem-separated segment 136A can include additional, fewer, or alternative audio stems).

FIG. 1B illustrates an arrow extending from the vocals stem 126A toward the output interface 106 of the device 100, indicating that the vocals stem 126A is queued by the device 100 for playback. The vocals stem 126A can be selected for playback based on user-defined settings/selections (e.g., the user selecting a stem separation mode wherein only vocals from the input audio signal 104 are played back). Although FIG. 1B only depicts a single audio stem from the stem-separated segment 136A as being queued for playback, multiple and/or other audio stems of the stem-separated segment 136A may be played back (or omitted from playback) in accordance with the present disclosure.

Figure 1C:
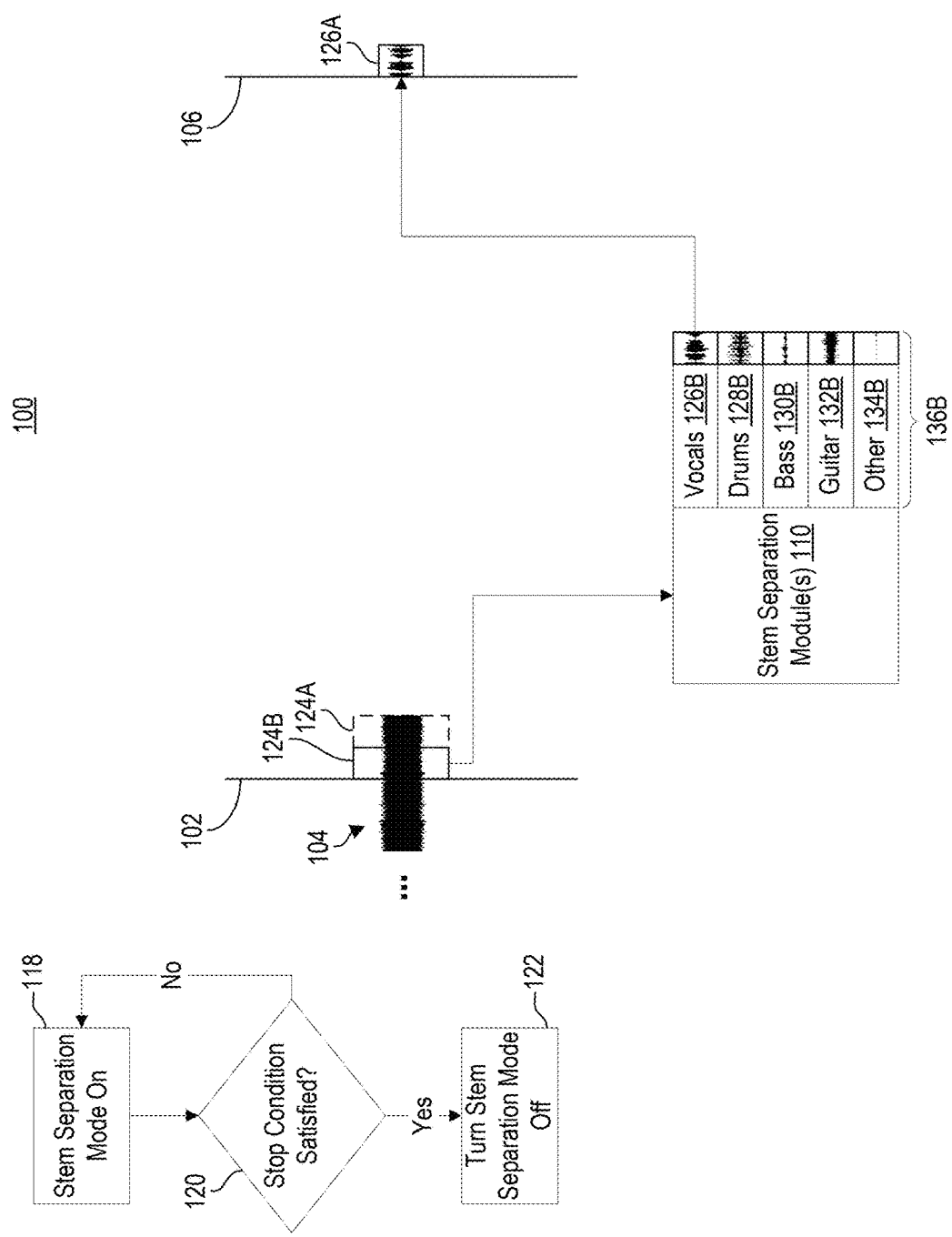

FIG. 1C conceptually depicts playback of the vocals stem 126A from FIG. 1B by illustrating the vocals stem 126A as having passed through the output interface 106 (traveling from the left to the right). The device 100 can cause playback of the vocals stem 126A in various ways, such as by providing or transmitting a stem-separated audio signal (digital or analog) based on the vocals stem 126A to one or more speakers of the device 100 or to one or more off-device playback components/devices. The device 100 may selectively refrain from causing playback of the remaining audio stems of the stem-separated segment 136A (e.g., in the example of FIG. 1B, the drums stem 128A, the bass stem 130A, the guitar stem 132A, and the other stem 134A).

FIG. 1C also conceptually depicts reception of the input audio signal 104 by the device 100 at the input interface 102 as having temporally progressed (e.g., with the input audio signal 104 having moved further to the right with a greater portion of the input audio signal 104 as having passed the input interface 102 from the left to the right). FIG. 1C depicts the segment 124A that was processed by the stem separation module(s) 110 as described above with reference to FIG. 1B, resulting in playback of the vocals stem 126A as shown in FIG. 1C. FIG. 1C also depicts another segment 124B identified from the input audio signal 104, which may be identified by the device 100 in a manner similar to that described hereinabove for identification of the segment 124A. The segment 124B may be identified during processing of the segment 124A by the stem separation module(s) 110 and/or during playback of the vocals stem 126A. Similar to segment 124A, segment 124B can comprise a single segment or multiple constituent segments. Segment 124B and segment 124A can be temporally adjacent and can be at least partially temporally overlapping.

In the example of FIG. 1C, processing of the segment 124B by the stem separation module(s) 110 is initiated, as indicated by the arrow extending from the segment 124B to the stem separation module(s) 110 in FIG. 1C. Processing of the segment 124B by the stem separation module(s) 110 can be initiated during processing of segment 124A by the stem separation module(s) 110 and/or during playback of the vocals stem 126A. The stem separation module(s) 110 can, in some implementations, include multiple instances of the same stem separation module to permit simultaneous, parallel, or at least partially temporally overlapping processing of different segments (e.g., segments 124A and 124B) of an input audio signal (e.g., input audio signal 104). By processing the segment 124B, the stem separation module(s) 110 may generate an additional stem-separated segment 136B that also includes audio stems associated with various audio sources represented in the segment 124B, including a vocals stem 126B, a drums stem 128B, a bass stem 130B, a guitar stem 132B, and an other stem 134B.

Figure 1D:
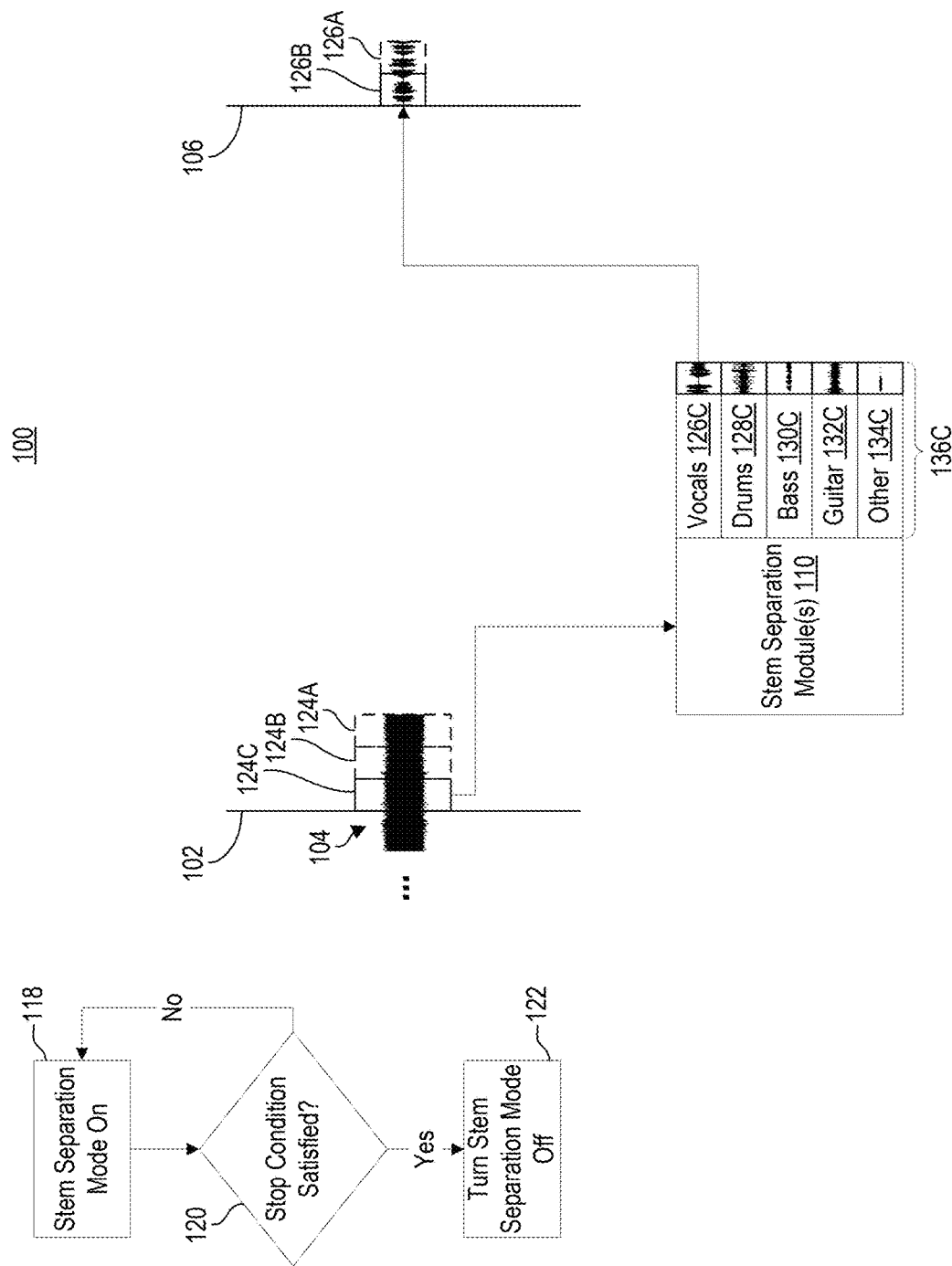

FIG. 1C illustrates an arrow extending from the vocals stem 126B toward the output interface 106 of the device 100, indicating that the vocals stem 126B is queued by the device 100 for playback. The audio stems that become queued for playback over consecutive timepoints can correspond to the same audio source from the input audio signal 104 (e.g., vocals, in the example of FIGS. 1B, 1C, and 1D). FIG. 1D conceptually depicts playback of the vocals stem 126B from FIG. 1C by illustrating the vocals stem 126B as having passed through the output interface 106 (traveling form the left to the right). The vocals stem 126B may be played back after playback of the vocals stem 126A (or as a transition out of playback of the vocals stem 126A). Various stitching or reconstruction processes may be performed on the vocals stem 126A and the vocals stem 126B to facilitate a smooth transition and continuous playback across the two stems.

FIG. 1D also illustrates identification of another segment 124C from the input audio signal 104 and processing of the segment 124C by the stem separation module(s) 110 to obtain another stem-separated segment 136C associated with multiple audio stems (i.e., a vocals stem 126C, a drums stem 128C, a bass stem 130C, a guitar stem 132C, and an other stem 134C), which may be performed during processing of the segment 124B by the stem separation module(s) 110 or during playback of the vocals stem 126B (or any preceding stem, such as vocals stem 126A).

While the stem separation mode is on (indicated by block 118), the device 100 can continue to iteratively identify segments from the input audio signal 104, process the identified audio segments using the stem separation module(s) 110 to obtain stem-separated segments, and cause playback of one or more audio stems from the stem-separated segments until the stop condition is satisfied (indicated by the "Yes" extending from block 120). For a given iteration of generating one or more stem-separated segments, the steps of identifying audio segment(s) from the input audio signal 104 and/or processing the audio segment(s) using the stem separation module(s) 110 to generate the stem-separated segment(s) during the processing of preceding audio segment(s) to generate preceding stem-separated segment(s) and/or during playback of one or more preceding audio stems from the preceding stem-separated segment(s).

After the stop condition is satisfied, the device 100 can deactivate the stem separation mode (indicated by block 122) and continue to provide the output audio signal 108 from the input audio signal 104 as described hereinabove with reference to FIG. 1A (or may cease/pause playback or perform a different operation, such as scrubbing/navigation, etc.).

In some implementations, the input audio signal 104 is associated with an input video signal. In such instances, while the stem separation mode is in an "on" state, playback of the input video signal may be selectively delayed to facilitate temporal synchronization with playback of audio stem(s) separated from the input audio signal 104 via the stem separation module(s) 110. For example, the processing time for generating stem-separated segment via the stem separation module(s) may be determined and used by a system to delay playback of video frames by the system such that the playback of the video frames is temporally synchronized with playback of one or more audio stems from generated stem-separated segments. The processing time may be predefined and/or dynamically measured/updated. In some instances, the system utilizes the processing time in combination with latency associated with a playback device (e.g., a wireless speaker) to synchronize playback of video frames with playback of temporally corresponding audio stems (from generated stem-separated segments) on the playback device. The processing time associated with the stem separation module(s) and/or the latency of the playback device may be used to synchronize timestamps of video frames and audio stems for playback (e.g., on a display and an audio playback device).

Although the examples discussed hereinabove with reference to FIGS. 1A through 1D focus, in at least some respects, on implementations where the stem separation mode facilitates playback of a single audio stem (e.g., the vocals stem) from the input audio signal 104, other playback configurations that leverage the separated stems are achievable by implementing the disclosed principles. For instance, volume level changes or other transformations may be applied to individual audio stems of stem-separated segments for playback, which can improve spatial audio experiences or facilitate, for example, voice enhancement for improving the clarity and/or volume of dialogue in audio-visual content. In this regard, one or more transformations or additional or alternative audio processing operations may be applied to one or more individual stems of a stem-separated segment in preparation for playback, and the transformed or further processed individual stem(s) may be played back (alone or in combination with one or more or all other stems of the stem-separated segment).

Figure 2:
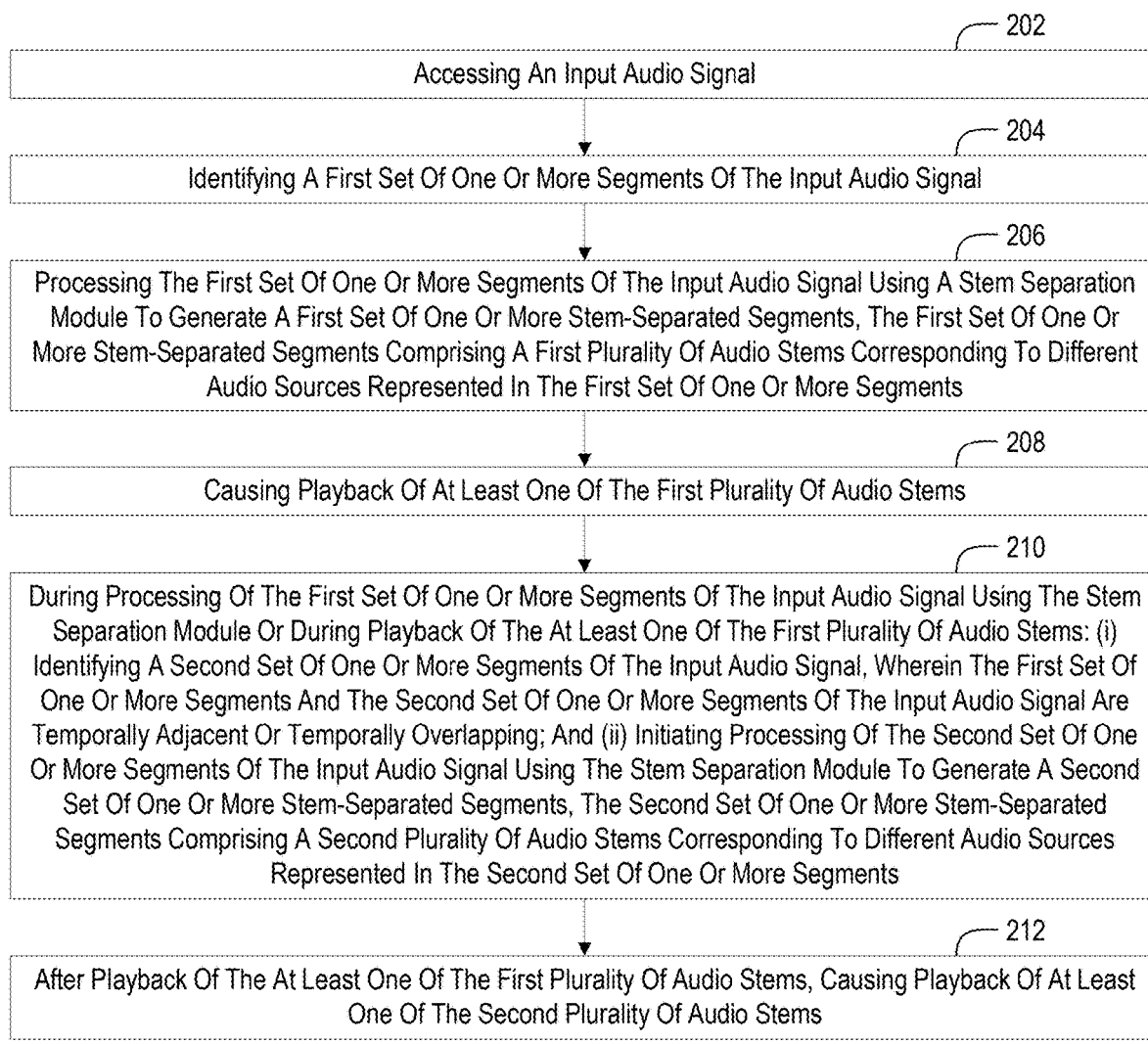
FIGS. 2 and 3 illustrate example flow diagrams depicting acts associated with the disclosed subject matter.
Figure 3:
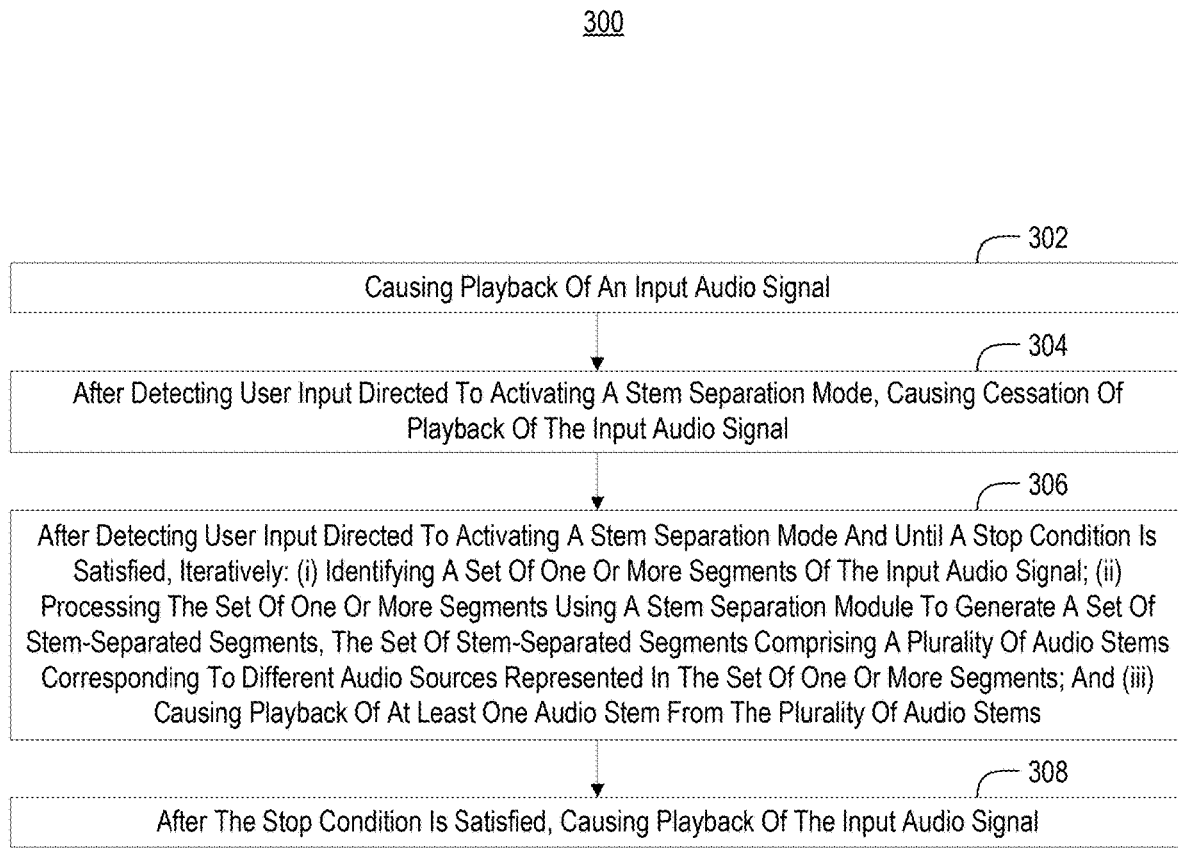

FIGS. 2 and 3 illustrate example flow diagrams 200 and 300, respectively, depicting acts associated with the disclosed subject matter. The acts described with reference to FIGS. 2 and 3 can be performed using one or more components of one or more systems 1200 described hereinafter with reference to FIG. 12, such as processor(s) 1202, storage 1204, sensor(s) 1206, I/O system(s) 1208, communication system(s) 1210, remote system(s) 1212, etc. Although the acts may be described and/or shown in a certain order, no specific ordering is required unless explicitly stated or if the performance of one act depends on the completion of another. One will appreciate that one or more acts described herein may be omitted in various embodiments.

Act 202 of flow diagram 200 of FIG. 2 includes accessing an input audio signal. In some instances, the input audio signal comprises a digital audio signal associated with a digital audio file or a digital audio transmission. In some implementations, the input audio signal comprises a digital audio signal generated based on an input analog audio signal associated with an analog audio transmission. In some examples, the input audio signal is associated with an input video signal.

Act 204 of flow diagram 200 includes identifying a first set of one or more segments of the input audio signal.

Act 206 of flow diagram 200 includes processing the first set of one or more segments of the input audio signal using a stem separation module to generate a first set of one or more stem-separated segments, the first set of one or more stem-separated segments comprising a first plurality of audio stems corresponding to different audio sources represented in the first set of one or more segments.

Act 208 of flow diagram 200 includes causing playback of at least one of the first plurality of audio stems. In some embodiments, playback of the at least one of the first plurality of audio stems comprises refraining from playing one or more remaining audio stems of the first plurality of audio stems. In some instances, causing playback of the at least one of the first plurality of audio stems comprises transmitting a stem-separated audio signal corresponding to the at least one of the first plurality of audio stems to one or more playback devices. In some implementations, causing playback of the at least one of the first plurality of audio stems comprises causing one or more on-device speakers to play a stem-separated audio signal corresponding to the at least one of the first plurality of audio stems. In some examples, where the input audio signal is associated with an input video signal, playback of the input video signal may be delayed such that playback of the input video signal is temporally synchronized with playback of the at least one of the first plurality of audio stems and with playback of the at least one of the second plurality of audio stems.

Act 210 of flow diagram 200 includes during processing of the first set of one or more segments of the input audio signal using the stem separation module or during playback of the at least one of the first plurality of audio stems: (i) identifying a second set of one or more segments of the input audio signal, wherein the first set of one or more segments and the second set of one or more segments of the input audio signal are temporally adjacent or temporally overlapping; and (ii) initiating processing of the second set of one or more segments of the input audio signal using the stem separation module to generate a second set of one or more stem-separated segments, the second set of one or more stem-separated segments comprising a second plurality of audio stems corresponding to different audio sources represented in the second set of one or more segments.

Act 212 of flow diagram 200 includes after playback of the at least one of the first plurality of audio stems, causing playback of at least one of the second plurality of audio stems. In some embodiments, the at least one of the second plurality of audio stems comprises the same audio source(s) as the at least one of the first plurality of audio stems.

Act 302 of flow diagram 300 of FIG. 3 includes causing playback of an input audio signal. In some instances, the input audio signal comprises a digital audio signal associated with a digital audio file or a digital audio transmission. In some implementations, the input audio signal comprises a digital audio signal generated based on an input analog audio signal associated with an analog audio transmission.

Act 304 of flow diagram 300 includes, after detecting user input directed to activating a stem separation mode, causing cessation of playback of the input audio signal.

Act 306 of flow diagram 300 includes, after detecting user input directed to activating a stem separation mode and until a stop condition is satisfied, iteratively: (i) identifying a set of one or more segments of the input audio signal; (ii) processing the set of one or more segments using a stem separation module to generate a set of stem-separated segments, the set of stem-separated segments comprising a plurality of audio stems corresponding to different audio sources represented in the set of one or more segments; and (iii) causing playback of at least one audio stem from the plurality of audio stems. In some examples, the stem separation module is selected based on (i) user input selecting the stem separation module or (ii) pre-processing of the input audio signal to select the stem separation module. In some embodiments, the stop condition comprises performance of a predetermined number of iterations. In some instances, the stop condition comprises detecting user input directed to deactivating the stem separation mode. In some implementations, playback of the at least one audio stem from the plurality of audio stems comprises refraining from playing one or more remaining audio stems of the plurality of audio stems. In some examples, (i) identifying the set of one or more segments of the input audio signal or (ii) processing the set of one or more segments using the stem separation module to generate the set of stem-separated segments occurs during (a) processing of a preceding set of one or more segments of the input audio signal using the stem separation module to generate a preceding set of stem-separated segments comprising a plurality of preceding audio stems corresponding to different audio sources represented in the preceding set of one or more segments or during (b) playback of at least one preceding audio stem from the plurality of preceding audio stems. In some embodiments, the preceding set of one or more segments is identified after detecting user input directed to activating the stem separation mode in a previous iteration.

Act 308 of flow diagram 300 includes, after the stop condition is satisfied, causing playback of the input audio signal.

In some embodiments, at least some of the principles described herein may be implemented to facilitate system-level stem separation (or device-level stem separation) of system output audio signals (or device output audio signals). For instance, a system or device may comprise an operating system (OS), which is a fundamental layer of software that manages a system's hardware and software resources, providing an interface between users, applications, and hardware. Applications on systems or devices comprise programs designed to perform specific tasks for users (e.g., media consumption, web browsing, word processing, communication, etc.). Applications executing on a system or device can generate audio signals or streams. For example, a media player, video conferencing app, game, or web browser can produce sound and/or create its own independent audio signal based on the type of content it is processing. A system or device may include a system audio output signal path for compositing, mixing, and/or processing the independent audio signals from the various sound-producing applications executing on the system or device (and potentially from the OS itself) to form a system output audio signal. The system audio output signal path can further send the system output audio signal to one or more playback devices to facilitate playback of the system-level sound/audio signals. The system audio output signal path can include various components for performing such functions, such as an OS audio subsystem (e.g., which may include various components such as an audio router, audio mixer, volume controller, audio processor, digital-to-analog and/or analog-to-digital converter, driver manager, audio driver, audio API, audio control panel, etc.), sound cards, audio chips, application-specific audio routing mechanisms/modules, etc.

In one example, to facilitate system-level stem separation functionality, a system may provide a control for activating or deactivating a system-level stem-separation mode. When the system-level stem separation mode is active, the system may refrain from sending or routing the system output audio signal to one or more playback devices via the system audio output signal path. Instead, the system may iteratively identify segments from the system output audio signal and process the identified segments using a stem separation module to generate stem-separated segments that include audio stems (e.g., similar to the processing of segment 124A of the input audio signal 104 by the stem separation module(s) 110 to provide the stem-separated segment 136A including the audio stems 126A, 128A, 130A, 132A, 134A). One or more of the audio stems may then be sent to the playback device(s) via the system audio output signal path.

In some implementations, system-level stem separation functionality may at least partially be controlled via one or more user interface frontends. A user interface frontend can include a visual or interactive part of a program or website that users can interact with. For instance, a user interface frontend can include one or more sections, interfaces, pages, or components that can present information to users (e.g., visually or otherwise) and/or provide a framework for facilitating user interaction such as by receiving user input (e.g., providing input fields, selectable elements/controls/buttons, etc.).

FIGS. 4 through 11 illustrate example user interface frontends that can facilitate or convey information related to system-level stem separation functionality.

Figure 4:
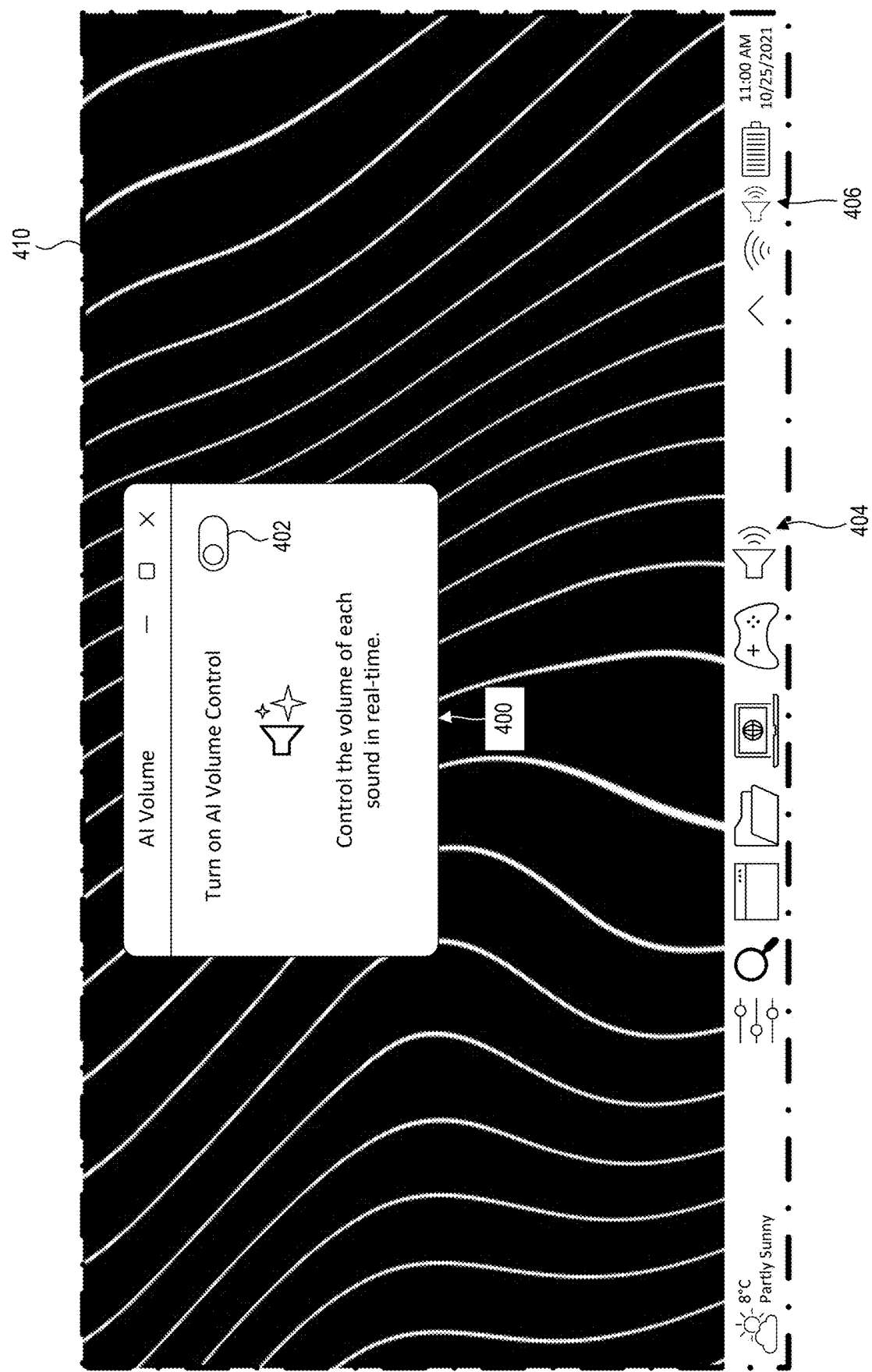
FIGS. 4 through 11 illustrate example user interface frontends that can facilitate or convey information related to system-level stem separation functionality.

FIG. 4 illustrates an example user interface frontend 400 that displays a control 402 for activating or deactivating a system-level stem separation mode. In the example shown in FIG. 4, the user interface frontend 400 is presented on a display 410 associated with a desktop computer (e.g., a type of system 1200, as described hereinafter). One will appreciate, in view of the present disclosure, that a user interface frontend that includes features and/or functionality related to system-level stem separation as described herein may be presented on other types of devices/systems (e.g., smartphones, tablets, head-mounted displays, other wearable devices, etc.) and/or with different presentation characteristics (e.g., visual characteristics). Similarly, as described previously, stem separation functionality as described herein may be achieved without a user interface frontend as conceptually described with reference to FIGS. 4 through 11 (e.g., stem separation may be achieved via hardware executing on a playback device such as a speaker or on an in-line device that lacks a display).

Furthermore, in the example shown in FIG. 4, the user interface frontend 400 is presented on a system via execution of an application installed on the system. For instance, FIG. 4 shows an icon 404 presented on the system/device for executing the application associated with presentation of the user interface frontend 400. One will appreciate, in view of the present disclosure, that a user interface frontend that includes features and/or functionality related to system-level stem separation as described herein may be part of the OS of a system (e.g., part of the OS layer rather than the application layer of the system). For example, FIG. 4 additionally illustrates a control element 406 that, when selected, may surface OS-level volume/audio controls associated with the OS layer (e.g., master volume, app-specific volume mixer, etc.). In some implementations, selection of an OS-level control element for configuring audio/volume aspects of a device/system may trigger presentation of an OS-level user interface frontend that facilitates control of system-level stem separation (e.g., functionally and/or information presentation similar to the user interface frontend 400 described herein). In this regard, the stem separation and/or other module(s) for achieving system-level stem separation may be within the application layer and/or the OS layer of a system or device.

FIG. 4 depicts the control 402 for activating or deactivating the system-level stem separation mode as a toggle switch for turning the mode/setting on or off. Controls on a user interface for activating and/or deactivating a system-level stem separation mode may take on various forms in various implementations. FIG. 4 depicts the control 402 in a deactivated state, indicating that the system-level stem separation mode is off. When the system-level stem separation mode is off, system output audio signals generated by the system may be sent to one or more playback devices for playback. The system output audio signal may comprise a composition or mixing of audio signals associated with all sound-producing applications executing on the system, and may additionally include audio signals from the OS itself. The system output audio signal may be generated and/or sent to the playback device(s) via a system audio output signal path of the system, which may include an OS audio subsystem and/or other components.

By way of illustration, referring to the example(s) discussed hereinabove with reference to FIG. 1A, when the system-level stem separation mode is off, the system output audio signal may be treated as the input audio signal 104, which may be sent to one or more playback devices via the system audio output signal path (e.g., to the output interface 106 for playback as the output audio signal 108) without being processed by the stem separation module(s) 110.

Figure 5:
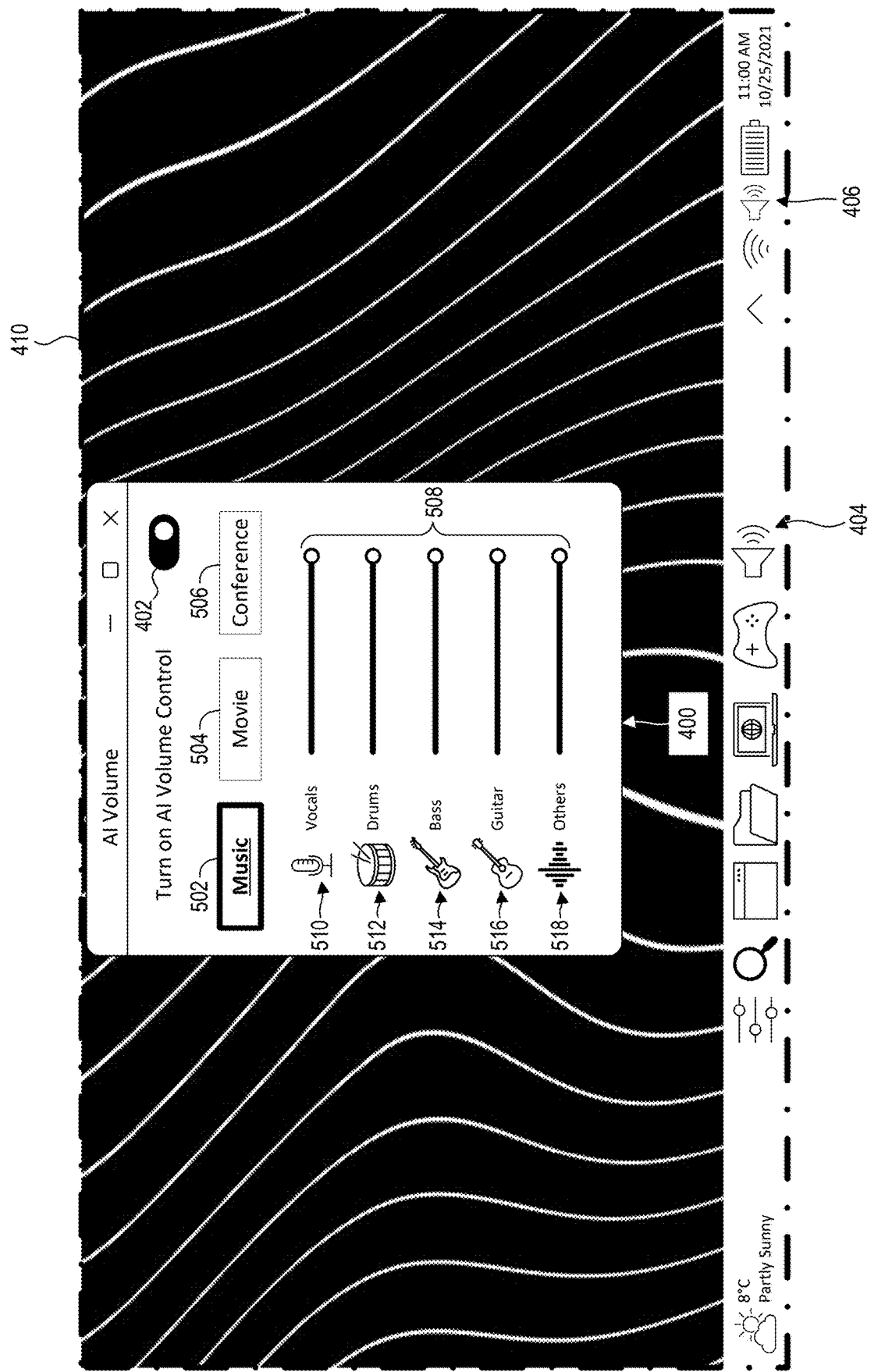

FIG. 5 illustrates the user interface frontend 400 with the control 402 in an activated state, indicating that the system-level stem separation mode is on. Activation/deactivation of the system-level stem separation mode may be achieved via user input directed to the control 402 (e.g., touch, click, voice, gesture, and/or other types of user input). When the system-level stem separation mode is active, the system output audio signals generated by the system may be rerouted to a stem separation pipeline. For instance, the system may refrain from sending the system output audio signal to the playback device(s) and instead may iteratively identify segments from the system output audio signal and process the segments using a selected stem separation module. The selected stem separation module may generate stem-separated segments, each of which may include audio stems associated with different audio sources (e.g., vocals, drums, bass, guitar, and other/remaining audio, or other sets of audio sources). One or more audio stems represented among the stem-separated segments generated by the selected stem separation module may be sent to the playback device(s) for playback (e.g., via the system audio output signal path). In some implementations, the system-level stem separation occurs in real-time or near-real-time. For example, the selected stem separation module may process the segment(s) identified from the system output audio signal(s) while processing one or more temporally preceding segments from the system output audio signal(s) (e.g., in parallel) and/or while one or more audio stems from previously generated stem-separated segments are being sent to or played back by the playback device(s). As another example, following generation of a system output audio signal by the system (or following provision of the system output audio signal to the stem separation module(s)), one or more stem-separated segments may be generated by processing the system output audio signal (or segments identified therefrom) via the stem separation module(s) within less than 1 second, less than 900 milliseconds, less than 800 milliseconds, less than 700 milliseconds, less than 600 milliseconds, less than 500 milliseconds, less than 400 milliseconds, less than 300 milliseconds, less than 200 milliseconds, less than 175 milliseconds, less than 150 milliseconds, less than 125 milliseconds, less than 100 milliseconds, less than 75 milliseconds, or less than 50 milliseconds. As yet another example, following generation of a system output audio signal by the system (or following provision of the system output audio signal to the stem separation module(s)), one or more audio stems from stem-separated segment(s) generated via the stem separation module(s) may be sent to one or more playback devices for playback within less than 1 second, less than 900 milliseconds, less than 800 milliseconds, less than 700 milliseconds, less than 600 milliseconds, less than 500 milliseconds, less than 400 milliseconds, less than 300 milliseconds, less than 200 milliseconds, less than 175 milliseconds, less than 150 milliseconds, less than 125 milliseconds, less than 100 milliseconds, less than 75 milliseconds, or less than 50 milliseconds.

By way of illustration, referring to the example(s) discussed hereinabove with reference to FIG. 1B through 1D, when the system-level stem separation mode is on, the system output audio signal may be treated as the input audio signal 104, from which segments may be identified (e.g., segments 124A, 124B, 124C) and processed by the stem separation module(s) 110 to generate stem-separated segments (e.g., segments 136A, 136B, 136C) including audio stems (e.g., stems 126A, 128A, 130A, 132A, 134A, 126B, 128B, 130B, 132B, 134B, 126C, 128C, 130C, 132C, 134C), any of which may be sent to the playback device(s) via the system audio output signal path (e.g., to the output interface 106) for playback. While the stem separation mode is on, the system may refrain from sending the system output audio signal itself to the playback device(s) via the system audio output signal path (e.g., to the output interface 106) for playback.

In the example shown in FIG. 5, the user interface frontend 400 includes selectable elements 502, 504, and 506 that are each associated with different stem separation modules that are available to process the segments identified from the system output audio signal. For instance, selectable element 502 is associated with a music stem separation module, selectable element 504 is associated with a movie or cinematic stem separation module, and selectable element 506 is associated with a conference stem separation module. The stem separation modules associated with the selectable elements 502, 504, and 506 can be configured to generate stem-separated segments with a respective set of audio sources or stems included therein. Different stem separation modules can have different sets of audio sources or stems represented in their output. For example, in the example shown in FIG. 5, the music stem separation module associated with selectable element 502 outputs stem-separated segments including a vocals stem, a drum stem, a bass stem, a guitar stem, and an others stem (which represents remaining audio). One will appreciate, in view of the present disclosure, that other audio sources/stems can be implemented for a music stem separation module (e.g., strings stems, piano stems, keys stems, wind stems, and/or others).

In some implementations, the selected stem separation module for processing the segments identified from the system output audio signal is determined by user input directed to the user interface frontend 400. For instance, FIG. 5 illustrates an example in which selectable element 502 associated with the music stem separation module is selected via the user interface frontend 400, which indicates that the music stem separation module will be used to perform stem separation on segments identified from the system output audio signal. The selection of selectable element 502 is indicated in FIG. 5 via bolding and underlining. FIG. 5 furthermore illustrates an example in which the user interface frontend 400 provides volume mixing controls 508 that include audio stem/source controls for the different audio stems/sources output by the music stem separation module (e.g., associated with selectable element 502). For instance, the volume mixing controls 508 include a vocals control 510, a drums control 512, a bass control 514, a guitar control 516, and an others control 518. In the example shown in FIG. 5, the controls for the different audio stems/sources are provided as slider controls for controlling the contribution that each of the audio stems/sources will provide to final audio output that becomes sent to the playback device(s) (e.g., via the system audio output signal path). In this regard, the audio stem(s) (and/or the volume or contribution thereof) that become sent to the playback device(s) for playback may be governed by the volume mixing controls provided at the user interface frontend 400. Other control modalities/forms are possible for the volume mixer control.

Figure 6:
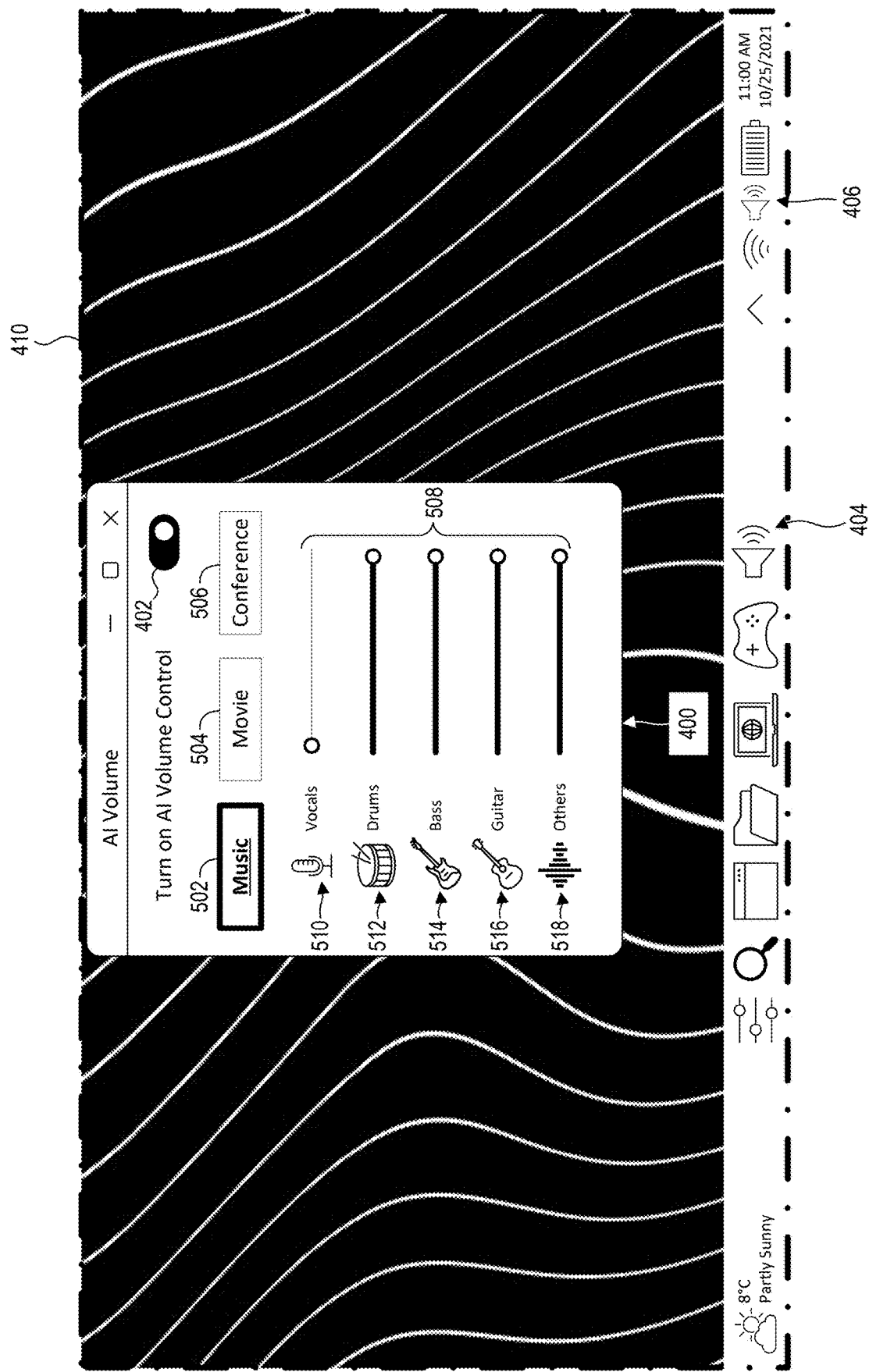
Figure 7:
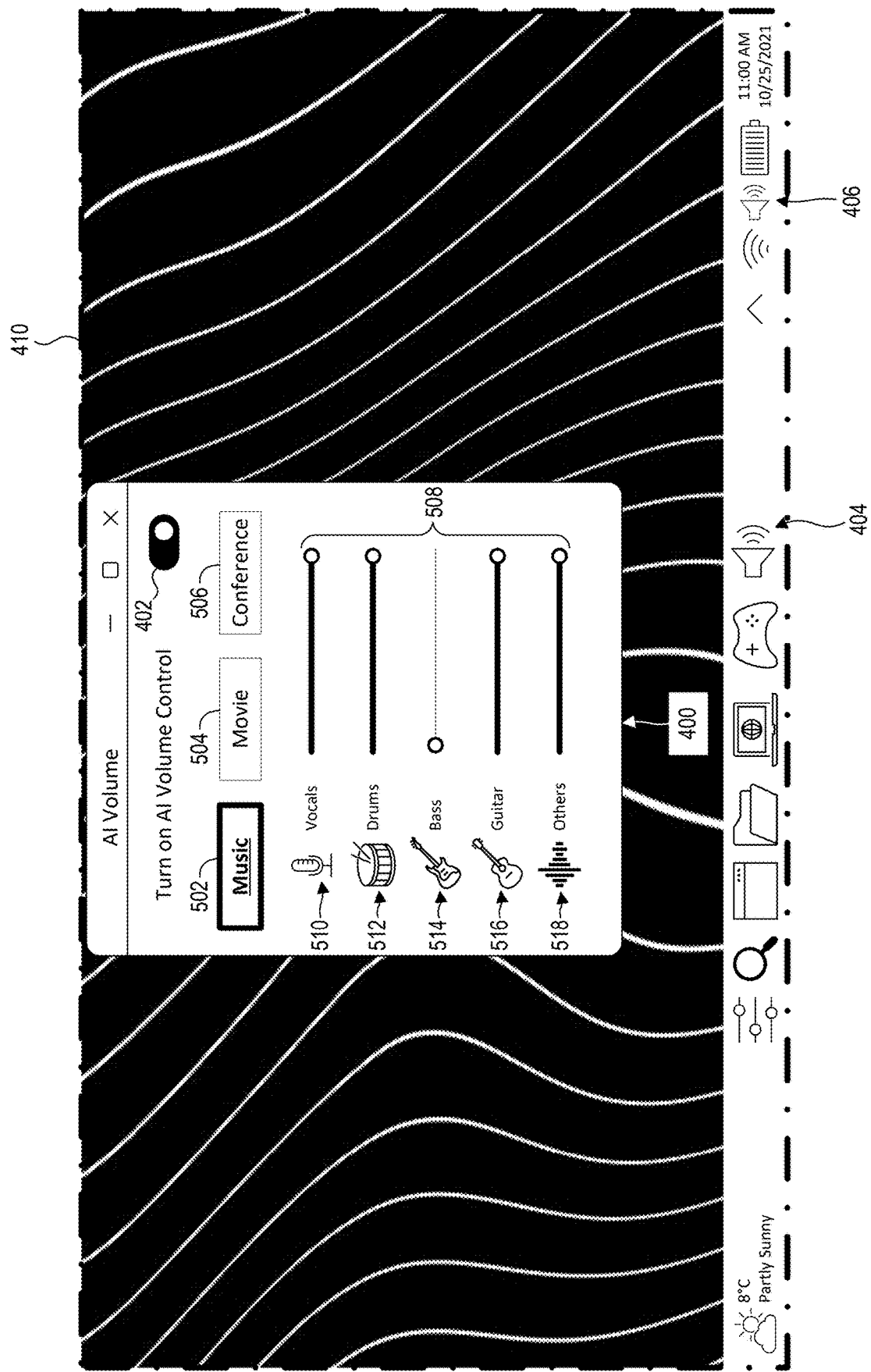

In the instance shown in FIG. 5, the volume mixing controls 508 are set to cause the full volume of each of the audio stems/sources output by the music stem separation module to be provided to the playback device(s). FIG. 6 illustrates an instance in which the vocals control 510 is set to off (or with the volume fully reduced), which can cause the vocals stem output by the music stem separation module to be omitted from the final audio output sent to the playback device(s) by the system. In other instances, the vocals control 510 may be set with reduced volume, which can cause the vocals stem output by the music stem separation module to be sent to the playback device(s) with reduced volume (e.g., relative to other stems). FIG. 7 illustrates an instance in which the bass control 514 is set to off, which can cause the bass stem output by the music stem separation module to be omitted in the final audio output sent to the playback device(s) by the system. The audio stems output by the selected stem separation module may thus be sent to the playback device(s) in accordance with the volume mixing controls provided on the user interface frontend 400. Any volume mixing settings for providing the audio stems output by the music stem separation module to the playback device(s) may be selected and implemented via the volume mixing controls 508.

Figure 8:
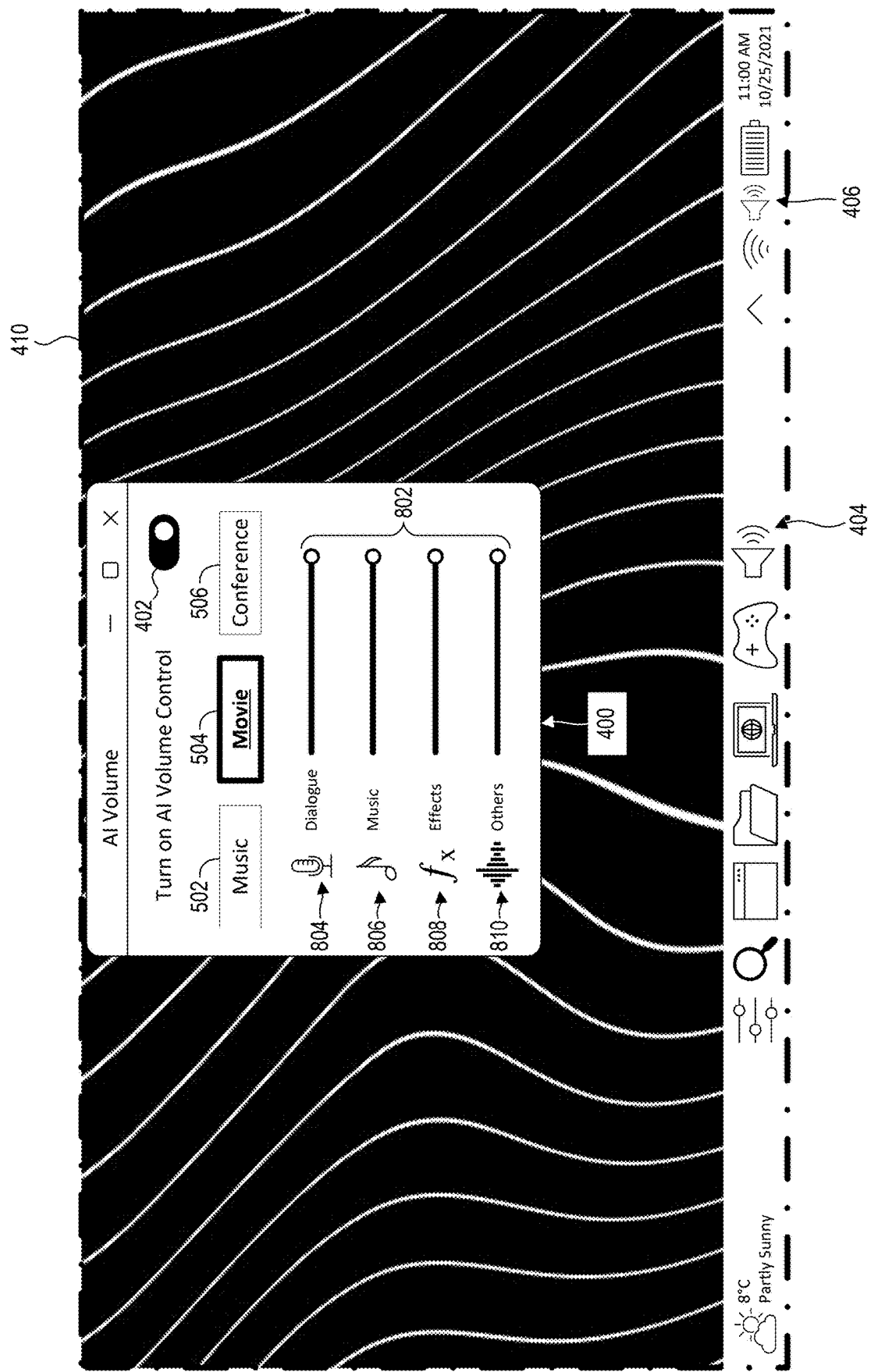
Figure 9:
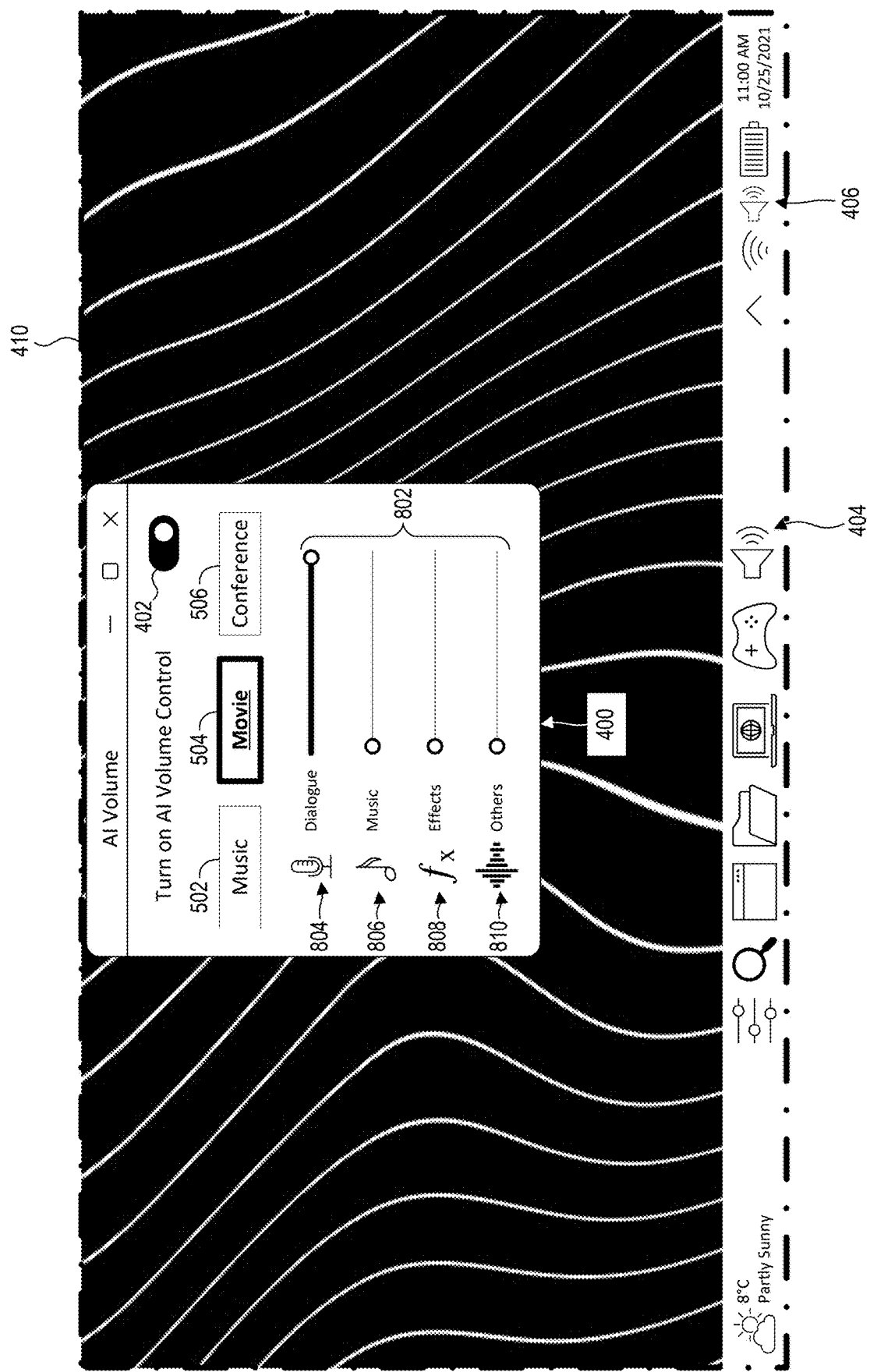

FIG. 8 illustrates an example in which selectable element 504 associated with the movie stem separation module is selected via the user interface frontend 400, which indicates that the movie stem separation module will be used to perform stem separation on segments identified from the system output audio signal. The selection of selectable element 504 is indicated in FIG. 8 via bolding and underlining. With selectable element 504 selected, the user interface frontend 400 provides volume mixing controls 802 that include audio stem/source controls for the different audio stems/sources output by the movie stem separation module. For instance, the volume mixing controls 802 include a dialogue control 804, a music control 806, an effects control 808, and an others control 810. In the instance shown in FIG. 8, the volume mixing controls 802 are set to cause the full volume of each of the audio stems/sources output by the movie stem separation module to be provided to the playback device(s). FIG. 9 illustrates an instance in which the music control 806, effects control 808, and others control 810 are set to off, which can cause the dialogue stem output by the movie stem separation module to be the only audio stem/source sent to the playback device(s) by the system. Any volume mixing settings for providing the audio stems output by the movie stem separation module to the playback device(s) may be selected and implemented via the volume mixing controls 802.

Figure 10:
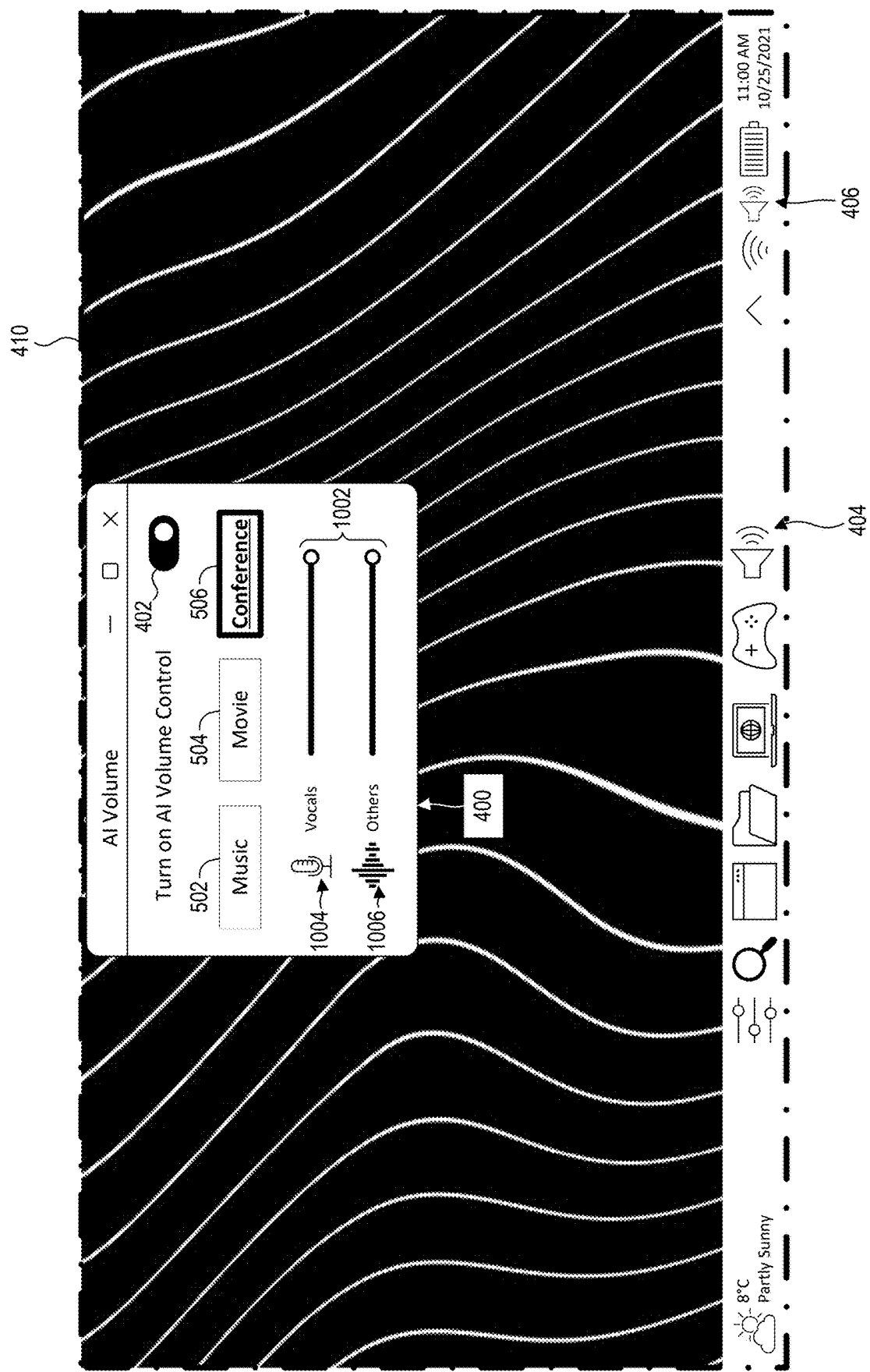
Figure 11:
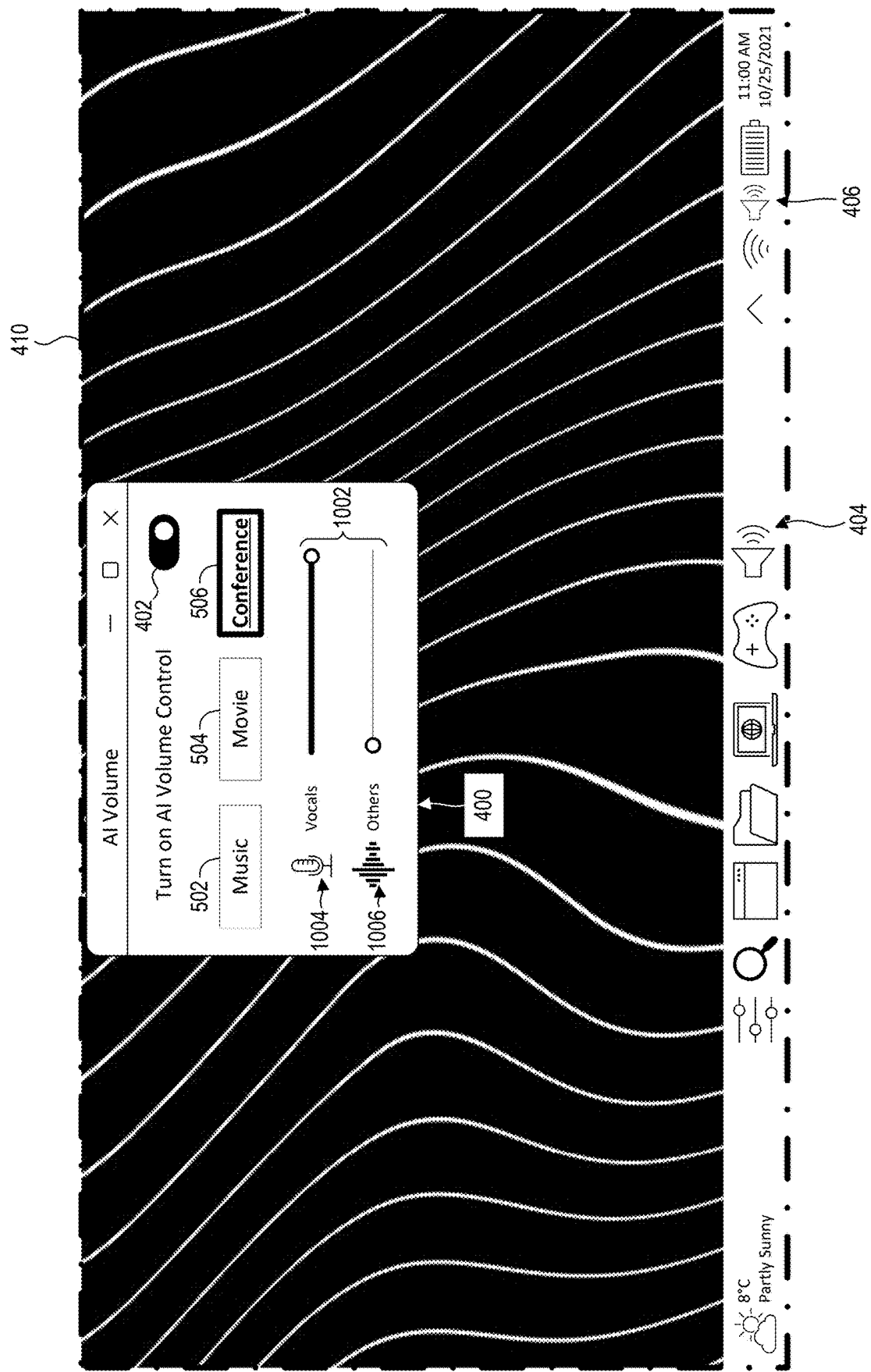

FIG. 10 illustrates an example in which selectable element 506 associated with the conference stem separation module is selected via the user interface frontend 400, which indicates that the conference stem separation module will be used to perform stem separation on segments identified from the system output audio signal. The selection of selectable element 506 is indicated in FIG. 10 via bolding and underlining. With selectable element 506 selected, the user interface frontend 400 provides volume mixing controls 1002 that include audio stem/source controls for the different audio stems/sources output by the conference stem separation module. For instance, the volume mixing controls 1002 include a vocals control 1004 and an others control 1006. In the instance shown in FIG. 10, the volume mixing controls 1002 are set to cause the full volume of each of the audio stems/sources output by the conference stem separation module to be provided to the playback device(s). FIG. 11 illustrates an instance in which the others control 1006 is set to off, which can cause the vocals stem output by the conference stem separation module to be the only audio stem/source sent to the playback device(s) by the system. Any volume mixing settings for providing the audio stems output by the conference stem separation module to the playback device(s) may be selected and implemented via the volume mixing controls 1002.

Although the examples shown and described with reference to FIGS. 4-11 have focused, in at least some respects, on a configuration in which the stem separation module for processing the system output audio signal (or segments thereof) is selected based user input provided via the user interface frontend 400, other configurations are possible. For instance, the stem separation module for processing the system output audio signal may be automatically selected based on an analysis or pre-processing of the system output audio signal itself (e.g., to determine identifying information and/or audio stems present) or based on the sound-producing application(s) that contribute audio to the system output audio signal. For instance, an audio type (e.g., music, movie, conference, or others) may be determined based on analysis of the system output audio signal or based on the identity or actions/operations of the application(s) contributing to the system output audio signal. The stem separation module to be used for performing system-level stem separation may then be selected based on the determined audio type. By way of illustrative example, when a video conferencing application generates an audio signal for a system, the system may automatically select the conference stem separation module to perform system-level stem separation when the system-level stem separation mode is active. As another example, when a media player application generates an audio signal for a system, the system may automatically select the music or movie stem separation module (based on the type of media being played by the media player application) to perform system-level stem separation when the system-level stem separation mode is active. A user interface frontend may be used to configure the volume mixing settings for playback of audio stems/sources output by each of the different stem separation modules when automatically selected for use.

Figure 12:
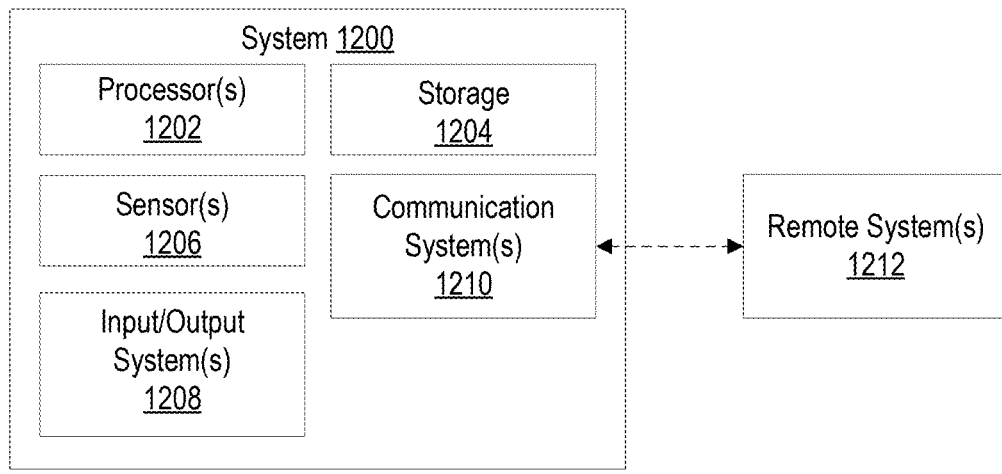
FIG. 12 depicts example components of a system that may comprise or be configurable to perform various embodiments.

FIG. 12 illustrates example components of a system 1200 that may comprise or implement aspects of one or more disclosed embodiments. For example, FIG. 12 illustrates an implementation in which the system 1200 includes processor(s) 1202, storage 1204, sensor(s) 1206, I/O system(s) 1208, and communication system(s) 1210. Although FIG. 12 illustrates a system 1200 as including particular components, one will appreciate, in view of the present disclosure, that a system 1200 may comprise any number of additional or alternative components.

The processor(s) 1202 may comprise one or more sets of electronic circuitries that include any number of logic units, registers, and/or control units to facilitate the execution of computer-readable instructions (e.g., instructions that form a computer program). Processor(s) 1202 can take on various forms, such as CPUs, NPUs, GPUs, or other types of processing units. Such computer-readable instructions may be stored within storage 1204. The storage 1204 may comprise physical system memory and may be volatile, non-volatile, or some combination thereof. Furthermore, storage 1204 may comprise local storage, remote storage (e.g., accessible via communication system(s) 1210 or otherwise), or some combination thereof. Additional details related to processors (e.g., processor(s) 1202) and computer storage media (e.g., storage 1204) will be provided hereinafter.

In some implementations, the processor(s) 1202 may comprise or be configurable to execute any combination of software and/or hardware components that are operable to facilitate processing using machine learning models or other artificial intelligence-based structures/architectures. For example, processor(s) 1202 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, transformer networks, generative adversarial networks, liquid state machines, extreme learning machines, echo state networks, deep residual networks, Kohonen networks, support vector machines, neural Turing machines, combinations thereof (or combinations of components thereof), and/or others.

As will be described in more detail, the processor(s) 1202 may be configured to execute instructions stored within storage 1204 to perform certain actions. In some instances, the actions may rely at least in part on communication system(s) 1210 for receiving data from remote system(s) 1212, which may include, for example, separate systems or computing devices, sensors, servers, and/or others. The communications system(s) 1210 may comprise any combination of software or hardware components that are operable to facilitate communication between on-system components/devices and/or with off-system components/devices. For example, the communications system(s) 1210 may comprise ports, buses, or other physical connection apparatuses for communicating with other devices/components. Additionally, or alternatively, the communications system(s) 1210 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 12 illustrates that a system 1200 may comprise or be in communication with sensor(s) 1206. Sensor(s) 1206 may comprise any device for capturing or measuring data representative of perceivable phenomenon. By way of non-limiting example, the sensor(s) 1206 may comprise one or more image sensors, microphones, thermometers, barometers, magnetometers, accelerometers, gyroscopes, and/or others.

Furthermore, FIG. 12 illustrates that a system 1200 may comprise or be in communication with I/O system(s) 1208. I/O system(s) 1208 may include any type of input or output device such as, by way of non-limiting example, a display, a touch screen, a mouse, a keyboard, a controller, and/or others, without limitation.

Disclosed embodiments include at least those presented in the following numbered clauses:

Clause 1. A device, comprising: one or more processing units; and one or more computer-readable recording media that store instructions that are executable by the one or more processing units to configure the device to: access an input audio signal; identify a first set of one or more segments of the input audio signal; process the first set of one or more segments of the input audio signal using a stem separation module to generate a first set of one or more stem-separated segments, the first set of one or more stem-separated segments comprising a first plurality of audio stems corresponding to different audio sources represented in the first set of one or more segments; cause playback of at least one of the first plurality of audio stems; during processing of the first set of one or more segments of the input audio signal using the stem separation module or during playback of the at least one of the first plurality of audio stems: identify a second set of one or more segments of the input audio signal, wherein the first set of one or more segments and the second set of one or more segments of the input audio signal are temporally adjacent or temporally overlapping; and initiate processing of the second set of one or more segments of the input audio signal using the stem separation module to generate a second set of one or more stem-separated segments, the second set of one or more stem-separated segments comprising a second plurality of audio stems corresponding to different audio sources represented in the second set of one or more segments; and after playback of the at least one of the first plurality of audio stems, cause playback of at least one of the second plurality of audio stems.

Clause 2. The device of clause 1, wherein the input audio signal comprises a digital audio signal associated with a digital audio file or a digital audio transmission.

Clause 3. The device of clause 1 or clause 2, wherein the input audio signal comprises a digital audio signal generated based on an input analog audio signal associated with an analog audio transmission.

Clause 4. The device of any one of clauses 1 through 3, wherein playback of the at least one of the first plurality of audio stems comprises refraining from playing one or more remaining audio stems of the first plurality of audio stems.

Clause 5. The device of any one of clauses 1 through 4, wherein causing playback of the at least one of the first plurality of audio stems comprises transmitting a stem-separated audio signal corresponding to the at least one of the first plurality of audio stems to one or more playback devices.

Clause 6. The device of any one of clauses 1 through 5, wherein the device comprises one or more speakers, and wherein causing playback of the at least one of the first plurality of audio stems comprises causing the one or more speakers to play a stem-separated audio signal corresponding to the at least one of the first plurality of audio stems.

Clause 7. The device of any one of clauses 1 through 6, wherein the at least one of the second plurality of audio stems comprises the same audio source(s) as the at least one of the first plurality of audio stems.

Clause 8. The device of any one of clauses 1 through 7, wherein the input audio signal is associated with an input video signal.

Clause 9. The device of clause 8, wherein the instructions are executable by the one or more processing units to configure the device to: cause delayed playback of the input video signal such that playback of the input video signal is temporally synchronized with playback of the at least one of the first plurality of audio stems and with playback of the at least one of the second plurality of audio stems.

Clause 10. A device, comprising: one or more processing units; and one or more computer-readable recording media that store instructions that are executable by the one or more processing units to configure the device to: cause playback of an input audio signal; and after detecting user input directed to activating a stem separation mode: cause cessation of playback of the input audio signal; and until a stop condition is satisfied, iteratively: identify a set of one or more segments of the input audio signal; process the set of one or more segments using a stem separation module to generate a set of stem-separated segments, the set of stem-separated segments comprising a plurality of audio stems corresponding to different audio sources represented in the set of one or more segments; and cause playback of at least one audio stem from the plurality of audio stems.

Clause 11. The device of clause 10, wherein the input audio signal comprises a digital audio signal associated with a digital audio file or a digital audio transmission.

Clause 12. The device of clause 10 or clause 11, wherein the input audio signal comprises a digital audio signal generated based on an input analog audio signal associated with an analog audio transmission.

Clause 13. The device of any one of clauses 10 through 12, wherein the stop condition comprises performance of a predetermined number of iterations.

Clause 14. The device of any one of clauses 10 through 13, wherein the stop condition comprises detecting user input directed to deactivating the stem separation mode.

Clause 15. The device of any one of clauses 10 through 14, wherein the instructions are executable by the one or more processing units to configure the device to: after the stop condition is satisfied, cause playback of the input audio signal.

Clause 16. The device of any one of clauses 10 through 15, wherein playback of the at least one audio stem from the plurality of audio stems comprises refraining from playing one or more remaining audio stems of the plurality of audio stems.

Clause 17. The device of any one of clauses 10 through 16, wherein the instructions are executable by the one more processing units to configure the device to (i) identify the set of one or more segments of the input audio signal or (ii) process the set of one or more segments using the stem separation module to generate the set of stem-separated segments during (a) processing of a preceding set of one or more segments of the input audio signal using the stem separation module to generate a preceding set of stem-separated segments comprising a plurality of preceding audio stems corresponding to different audio sources represented in the preceding set of one or more segments or (b) playback of at least one preceding audio stem from the plurality of preceding audio stems.

Clause 18. The device of clause 17, wherein the preceding set of one or more segments is identified after detecting user input directed to activating the stem separation mode in a previous iteration.

Clause 19. The device of any one of clauses 10 through 18, wherein the stem separation module is selected based on (i) user input selecting the stem separation module or (ii) pre-processing of the input audio signal to select the stem separation module.

Clause 20. A method, comprising: accessing an input audio signal; identifying a first set of one or more segments of the input audio signal; processing the first set of one or more segments of the input audio signal using a stem separation module to generate a first set of one or more stem-separated segments, the first set of one or more stem-separated segments comprising a first plurality of audio stems corresponding to different audio sources represented in the first set of one or more segments; causing playback of at least one of the first plurality of audio stems; during processing of the first set of one or more segments of the input audio signal using the stem separation module or during playback of the at least one of the first plurality of audio stems: identifying a second set of one or more segments of the input audio signal, wherein the first set of one or more segments and the second set of one or more segments of the input audio signal are temporally adjacent or temporally overlapping; and initiating processing of the second set of one or more segments of the input audio signal using the stem separation module to generate a second set of one or more stem-separated segments, the second set of one or more stem-separated segments comprising a second plurality of audio stems corresponding to different audio sources represented in the second set of one or more segments; and after playback of the at least one of the first plurality of audio stems, causing playback of at least one of the second plurality of audio stems.

Clause 21. A system, comprising: a system audio output signal path configurable for sending system output audio signals generated by the system to one or more playback devices; one or more processing units; and one or more computer-readable recording media that store instructions that are executable by the one or more processing units to configure the system to: present a user interface frontend that displays a control for activating a system-level stem separation mode; and after receiving user input directed to the control for activating the system-level stem separation mode, and when the system generates a system output audio signal based on audio associated with one or more applications executing on the system: refrain from sending the system output audio signal to the one or more playback devices; identify a set of one or more segments of the system output audio signal; process the set of one or more segments using a selected stem separation module to generate a set of stem-separated segments, the set of stem-separated segments comprising a plurality of audio stems; and send at least one audio stem from the plurality of audio stems to the one or more playback devices via the system audio output signal path.

Clause 22. The system of clause 21, wherein the user interface frontend is presented via execution of an application installed on the system.

Clause 23. The system of clause 21 or clause 22, wherein the user interface frontend comprises a part of an operating system of the system.

Clause 24. The system of any one of clauses 21 through 23, wherein the system audio output signal path comprises an operating system audio subsystem.

Clause 25. The system of any one of clauses 21 through 24, wherein the system output audio signal comprises a mixing of audio from all sound-producing applications executing on the system.

Clause 26. The system of any one of clauses 21 through 25, wherein the user interface frontend provides a plurality of selectable elements, wherein each of the plurality of selectable elements is associated with a respective stem separation module from a plurality of stem separation modules, wherein each respective stem separation module is associated with a respective set of audio sources.

Clause 27. The system of clause 26, wherein at least two respective stem separation modules are associated with different sets of audio sources.

Clause 28. The system of clause 26 or clause 27, wherein the selected stem separation module is selected from the plurality of stem separation modules based on user input selecting one of the plurality of selectable elements.

Clause 29. The system of any one of clauses 26 through 28, wherein the selected stem separation module is selected from the plurality of stem separation modules based on the system output audio signal or based on the one or more applications executing on the system.

Clause 30. The system of any one of clauses 26 through 29, wherein the user interface frontend provides, for each of the plurality of selectable elements, a respective set of volume mixing controls for the respective set of audio sources associated with the respective stem separation module.

Clause 31. The system of clause 30, wherein the at least one audio stem from the plurality of audio stems is sent to the one or more playback devices via the system audio output signal path in accordance with volume mixing settings defined via the respective set of volume mixing controls associated with the selected stem separation module.

Clause 32. The system of any one of clauses 21 through 31, wherein processing the set of one or more segments using the selected stem separation module to generate the set of stem-separated segments is performed during (a) processing of a preceding set of one or more segments of the system output audio signal using the selected stem separation module to generate a preceding set of stem-separated segments comprising a plurality of preceding audio stems or (b) sending at least one preceding audio stem from the plurality of preceding audio stems to the one or more playback devices via the system audio output signal path.

Clause 33. A system, comprising: a system audio output signal path configurable for sending system output audio signals generated by the system to one or more playback devices; one or more processing units; and one or more computer-readable recording media that store instructions that are executable by the one or more processing units to configure the system to: present a user interface frontend that displays a control for activating a system-level stem separation mode, wherein the user interface frontend provides a plurality of selectable elements, wherein each of the plurality of selectable elements is associated with a respective stem separation module from a plurality of stem separation modules, wherein each respective stem separation module is associated with a respective set of audio sources, wherein the user interface frontend provides, for each of the plurality of selectable elements, a respective set of volume mixing controls for the respective set of audio sources associated with the respective stem separation module; and after receiving user input directed to the control for activating the system-level stem separation mode, and when the system generates a system output audio signal based on audio associated with one or more applications executing on the system: refrain from sending the system output audio signal to the one or more playback devices; identify a set of one or more segments of the system output audio signal; process the set of one or more segments using a selected stem separation module from the plurality of stem separation modules to generate a set of stem-separated segments, the set of stem-separated segments comprising a plurality of audio stems corresponding to the respective set of audio sources associated with the selected stem separation module;

and send at least one audio stem from the plurality of audio stems to the one or more playback devices via the system audio output signal path.

Clause 34. The system of clause 33, wherein the user interface frontend is presented via execution of an application installed on the system.

Clause 35. The system of clause 33 or clause 34, wherein the user interface frontend comprises a part of an operating system of the system.

Clause 36. The system of any one of clauses 33 through 35, wherein the system audio output signal path comprises an operating system audio subsystem.

Clause 37. The system of any one of clauses 33 through 36, wherein the system output audio signal comprises a mixing of audio from all sound-producing applications executing on the system.

Clause 38. The system of any one of clauses 33 through 37, wherein at least two respective stem separation modules are associated with different sets of audio sources.

Clause 39. The system of any one of clauses 33 through 38, wherein the selected stem separation module is selected from the plurality of stem separation modules based on user input selecting one of the plurality of selectable elements.

Clause 40. The system of any one of clauses 33 through 39, wherein the selected stem separation module is selected from the plurality of stem separation modules based on the system output audio signal or based on the one or more applications executing on the system.

Clause 41. The system of any one of clauses 33 through 40, wherein the at least one audio stem from the plurality of audio stems is sent to the one or more playback devices via the system audio output signal path in accordance with volume mixing settings defined via the respective set of volume mixing controls associated with the selected stem separation module.

Clause 42. The system of any one of clauses 33 through 41, wherein processing the set of one or more segments using the selected stem separation module to generate the set of stem-separated segments is performed during (a) processing of a preceding set of one or more segments of the system output audio signal using the selected stem separation module to generate a preceding set of stem-separated segments comprising a plurality of preceding audio stems or (b) sending at least one preceding audio stem from the plurality of preceding audio stems to the one or more playback devices via the system audio output signal path.

Clause 43. A method, comprising: presenting a user interface frontend that displays a control for activating a system-level stem separation mode; and after receiving user input directed to the control for activating the system-level stem separation mode, and when a system generates a system output audio signal based on audio associated with one or more applications executing on the system: refraining from sending the system output audio signal to one or more playback devices over a system audio output signal path of the system that is configurable for sending system output audio signals generated by the system to the one or more playback devices; identifying a set of one or more segments of the system output audio signal; processing the set of one or more segments using a selected stem separation module to generate a set of stem-separated segments, the set of stem-separated segments comprising a plurality of audio stems; and sending at least one audio stem from the plurality of audio stems to the one or more playback devices via the system audio output signal path.

Clause 44. The method of clause 43, wherein the user interface frontend is presented via execution of an application installed on the system.

Clause 45. The method of clause 43 or clause 44, wherein the user interface frontend comprises a part of an operating system of the system.

Clause 46. The method of any one of clauses 43 through 45, wherein the system audio output signal path comprises an operating system audio subsystem.

Clause 47. The method of any one of clauses 43 through 46, wherein the system output audio signal comprises a mixing of audio from all sound-producing applications executing on the system.

Clause 48. The method of any one of clauses 43 through 47, wherein the user interface frontend provides a plurality of selectable elements, wherein each of the plurality of selectable elements is associated with a respective stem separation module from a plurality of stem separation modules, wherein each respective stem separation module is associated with a respective set of audio sources.

Clause 49. The method of clause 48, wherein at least two respective stem separation modules are associated with different sets of audio sources.

Clause 50. The method of clause 48 or clause 49, wherein the selected stem separation module is selected from the plurality of stem separation modules based on user input selecting one of the plurality of selectable elements.

Clause 51. The method of any one of clauses 48 through 50, wherein the selected stem separation module is selected from the plurality of stem separation modules based on the system output audio signal or based on the one or more applications executing on the system.

Clause 52. The method of any one of clauses 48 through 51, wherein the user interface frontend provides, for each of the plurality of selectable elements, a respective set of volume mixing controls for the respective set of audio sources associated with the respective stem separation module.

Clause 53. The method of clause 52, wherein the at least one audio stem from the plurality of audio stems is sent to the one or more playback devices via the system audio output signal path in accordance with volume mixing settings defined via the respective set of volume mixing controls associated with the selected stem separation module.

Clause 54. The method of any one of clauses 43 through 53, wherein processing the set of one or more segments using the selected stem separation module to generate the set of stem-separated segments is performed during (a) processing of a preceding set of one or more segments of the system output audio signal using the selected stem separation module to generate a preceding set of stem-separated segments comprising a plurality of preceding audio stems or (b) sending at least one preceding audio stem from the plurality of preceding audio stems to the one or more playback devices via the system audio output signal path.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "computer-readable recording media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is currently claimed is:

1. A system, comprising:
  a system audio output signal path configurable for sending system output audio signals generated by the system to one or more playback devices;
  one or more processing units; and
  one or more computer-readable recording media that store instructions that are executable by the one or more processing units to configure the system to:
    present a user interface frontend that displays a control for activating a system-level stem separation mode; and
    after receiving user input directed to the control for activating the system-level stem separation mode, and when the system generates a system output audio signal based on audio associated with one or more applications executing on the system:

refrain from sending the system output audio signal to the one or more playback devices;

identify a set of one or more segments of the system output audio signal;

process the set of one or more segments using a selected stem separation module to generate a set of stem-separated segments, the set of stem-separated segments comprising a plurality of audio stems; and send at least one audio stem from the plurality of audio stems to the one or more playback devices via the system audio output signal path.

2. The system of claim 1, wherein the user interface frontend is presented via execution of an application installed on the system.

3. The system of claim 1, wherein the user interface frontend comprises a part of an operating system of the system.

4. The system of claim 1, wherein the system audio output signal path comprises an operating system audio subsystem.

5. The system of claim 1, wherein the system output audio signal comprises a mixing of audio from all sound-producing applications executing on the system.

6. The system of claim 1, wherein the user interface frontend provides a plurality of selectable elements, wherein each of the plurality of selectable elements is associated with a respective stem separation module from a plurality of stem separation modules, wherein each respective stem separation module is associated with a respective set of audio sources.

7. The system of claim 6, wherein the selected stem separation module is selected from the plurality of stem separation modules based on user input selecting one of the plurality of selectable elements.

8. The system of claim 6, wherein the selected stem separation module is selected from the plurality of stem separation modules based on the system output audio signal or based on the one or more applications executing on the system.

9. The system of claim 6, wherein the user interface frontend provides, for each of the plurality of selectable elements, a respective set of volume mixing controls for the respective set of audio sources associated with the respective stem separation module.

10. The system of claim 9, wherein the at least one audio stem from the plurality of audio stems is sent to the one or more playback devices via the system audio output signal path in accordance with volume mixing settings defined via the respective set of volume mixing controls associated with the selected stem separation module.

11. The system of claim 1, wherein processing the set of one or more segments using the selected stem separation module to generate the set of stem-separated segments is performed during (a) processing of a preceding set of one or more segments of the system output audio signal using the selected stem separation module to generate a preceding set of stem-separated segments comprising a plurality of preceding audio stems or (b) sending at least one preceding audio stem from the plurality of preceding audio stems to the one or more playback devices via the system audio output signal path.

12. A system, comprising:

a system audio output signal path configurable for sending system output audio signals generated by the system to one or more playback devices;

one or more processing units; and one or more computer-readable recording media that store instructions that are executable by the one or more processing units to configure the system to:

present a user interface frontend that displays a control for activating a system-level stem separation mode, wherein the user interface frontend provides a plurality of selectable elements, wherein each of the plurality of selectable elements is associated with a respective stem separation module from a plurality of stem separation modules, wherein each respective stem separation module is associated with a respective set of audio sources, wherein the user interface frontend provides, for each of the plurality of selectable elements, a respective set of volume mixing controls for the respective set of audio sources associated with the respective stem separation module; and after receiving user input directed to the control for activating the system-level stem separation mode, and when the system generates a system output audio signal based on audio associated with one or more applications executing on the system:

refrain from sending the system output audio signal to the one or more playback devices;

identify a set of one or more segments of the system output audio signal;

process the set of one or more segments using a selected stem separation module from the plurality of stem separation modules to generate a set of stem-separated segments, the set of stem-separated segments comprising a plurality of audio stems corresponding to the respective set of audio sources associated with the selected stem separation module; and send at least one audio stem from the plurality of audio stems to the one or more playback devices via the system audio output signal path.

13. The system of claim 12, wherein the user interface frontend is presented via execution of an application installed on the system.

14. The system of claim 12, wherein the user interface frontend comprises a part of an operating system of the system.

15. The system of claim 12, wherein the system output audio signal comprises a mixing of audio from all sound-producing applications executing on the system.

16. The system of claim 12, wherein the selected stem separation module is selected from the plurality of stem separation modules based on user input selecting one of the plurality of selectable elements.

17. The system of claim 12, wherein the selected stem separation module is selected from the plurality of stem separation modules based on the system output audio signal or based on the one or more applications executing on the system.

18. The system of claim 12, wherein the at least one audio stem from the plurality of audio stems is sent to the one or more playback devices via the system audio output signal path in accordance with volume mixing settings defined via the respective set of volume mixing controls associated with the selected stem separation module.

19. The system of claim 12, wherein processing the set of one or more segments using the selected stem separation module to generate the set of stem-separated segments is performed during (a) processing of a preceding set of one or more segments of the system output audio signal using the selected stem separation module to generate a preceding set of stem-separated segments comprising a plurality of preceding audio stems or (b) sending at least one preceding audio stem from the plurality of preceding audio stems to the one or more playback devices via the system audio output signal path.

20. A method, comprising:
  presenting a user interface frontend that displays a control for activating a system-level stem separation mode; and
  after receiving user input directed to the control for activating the system-level stem separation mode, and when a system generates a system output audio signal based on audio associated with one or more applications executing on the system:
    refraining from sending the system output audio signal to one or more playback devices over a system audio output signal path of the system that is configurable for sending system output audio signals generated by the system to the one or more playback devices;
    identifying a set of one or more segments of the system output audio signal;
    processing the set of one or more segments using a selected stem separation module to generate a set of stem-separated segments, the set of stem-separated segments comprising a plurality of audio stems; and
    sending at least one audio stem from the plurality of audio stems to the one or more playback devices via the system audio output signal path.

* * * * *